US012767267B2

(12) United States Patent
Swenson et al.

(10) Patent No.: US 12,767,267 B2
(45) Date of Patent: Oct. 20, 2026

(54) PROPULSION AND LOAD DISTRIBUTION SYSTEM FOR PEDAL ACTUATED VEHICLE

(71) Applicant: University of Idaho, Moscow, ID (US)

(72) Inventors: Matthew Swenson, Moscow, ID (US); Ted Carton, Clarkston, WA (US); Robert Howell, Lewiston, ID (US); Thomas Howell, Lapwai, ID (US); Laurie Delenin, Dergneau (BE); Caitlin Swenson, Bremerton, WA (US); Robert H.R. Carne, Moscow, ID (US); Anson Lundstrom, Nampa, ID (US); Kirk D. McKenzie, Hayden, ID (US)

(73) Assignee: University of Idaho, Moscow, ID (US)

( * ) Notice: Subject to any disclaimer, the term of this patent is extended or adjusted under 35 U.S.C. 154(b) by 670 days.

(21) Appl. No.: 18/135,031

(22) Filed: Apr. 14, 2023

(65) Prior Publication Data

US 2023/0331338 A1 Oct. 19, 2023

Related U.S. Application Data

(60) Provisional application No. 63/331,473, filed on Apr. 15, 2022.

(51) Int. Cl.

| | |
|---|---|
| ***B62K 27/00*** | (2006.01) |
| ***B60G 3/14*** | (2006.01) |
| ***B60G 11/14*** | (2006.01) |
| ***B62D 59/04*** | (2006.01) |
| ***B62K 27/02*** | (2006.01) |
| ***B62K 27/06*** | (2006.01) |

(52) U.S. Cl.

CPC .............. *B62K 27/003* (2013.01); *B60G 3/14* (2013.01); *B60G 11/14* (2013.01); *B62D 59/04* (2013.01); *B62K 27/02* (2013.01); *B62K 27/06* (2013.01); *B60G 2200/132* (2013.01); *B60G 2202/12* (2013.01); *B60G 2206/10* (2013.01); *B60G 2206/42* (2013.01); *B60G 2300/04* (2013.01); *B60G 2800/162* (2013.01)

(58) Field of Classification Search

CPC ...... B62K 27/003; B62K 27/02; B62K 27/06; B60G 3/14; B60G 3/145; B60G 5/02; B60G 11/14; B60G 2200/132; B60G 2202/12; B60G 2204/124; B60G 2204/41; B60G 2204/1244; B60G 2206/10; B60G 2206/42; B60G 2300/04; B60G 2800/162; B62D 59/04; B62M 6/40; B62J 1/00; B62J 43/26

USPC ................................................. 180/14.2, 220

See application file for complete search history.

(56) References Cited

U.S. PATENT DOCUMENTS 3,458,173 A * 7/1969 Kornovich ................ B66F 3/08 254/420

2002/0038730 A1 * 4/2002 Bidwell ................... B62M 7/16 180/15

FOREIGN PATENT DOCUMENTS

GB 2508085 A * 5/2014 ............ B60G 11/15

* cited by examiner

*Primary Examiner* — Valentin Neacsu

*Assistant Examiner* — Felicia L. Brittman-Alabi

(74) *Attorney, Agent, or Firm* — Klarquist Sparkman, LLP

(57) ABSTRACT

This disclosure concerns a propulsion and load distribution system for a pedal actuated vehicle. More specifically, this disclosure is directed to an electrically powered frame, trailer, vehicle, trailer, cart, and/or cycle coupled to at least one motorized wheel operably connected thereto. In some embodiments, the propulsion system can be operably associated with a load distribution system comprising a rocker arm and a spring that are configured to be associated with a frame having an axle or to which an axle can be mounted.

15 Claims, 19 Drawing Sheets
(12 of 19 Drawing Sheet(s) Filed in Color)

PROPULSION AND LOAD DISTRIBUTION SYSTEM FOR PEDAL ACTUATED VEHICLE

CROSS REFERENCE TO RELATED APPLICATION

This application claims the benefit under 35 U.S.C. § 119(e) of the earlier filing date of U.S. Provisional Application No. 63/331,473, filed on Apr. 15, 2022, which is incorporated herein by reference in its entirety, and is further related to subject matter disclosed by U.S. Provisional Application No. 63/331,475, filed on Apr. 15, 2022, which also is incorporated herein by reference.

FIELD

The present disclosure concerns an electrically powered vehicle, such as a pedal-actuated cycle, with certain embodiments further comprising a load distribution system comprising a first-class lever.

BACKGROUND

The demand for electrically powered bicycles has significantly increased as they have become much more economically priced due to modern advancements in energy storage technologies. This allows almost anyone to ride a bicycle without the strenuous physical activity typically required to operate traditional bicycles. More people are now enjoying longer bicycle excursions because of the electrical assistance provided by electric bicycles. Additionally, significantly increased development of bicycle trails has also encouraged people to pursue bicycle riding. For example, organizations have converted unused railroad beds into dedicated bicycle trails, which have been of significant interest to bicycle riders because they are predominately flat, thereby enabling riders to enjoy a relatively easy ride. The combination of affordable electric bicycles and the expansion of new bicycle trails has created new opportunities and incentives for people to explore the outdoors using electric bicycles.

However, electric bicycles are currently limited to single rider configurations because of the limited power available for current electric bicycles, which does not allow for additional passengers. Thus, many people that are unable to ride a bicycle due to inability, or disability, are deprived from the opportunity that electric bicycles provide. Recent attempts to build "sidecars" similar to those used in motorcycles to onboard passengers have been unsuccessful because the bicycle pilot must still provide enough power to transport the additional weight of the added passenger. Similarly, trailers exist on the market for carrying various cargo, but most are limited to capacities at or below 100 pounds, which are not powered, so additional effort is required from the rider.

Moreover, traditional suspension systems in tow-behind trailers include traditional leaf spring designs and Torflex™ suspension systems. These systems have remained unchanged for decades due to their long-standing acceptance in the market, their simplicity, and their cost-effectiveness. Both systems use a pair of reaction springs on each side of the trailer that act independently of each other. The advantage of these systems is that they enable the trailer to navigate terrain obstacles that only effect one side of the vehicle such as when the trailer is pulled over uneven terrain. The independent actions of the springs allow for the affected side to respond to the obstacle without dramatic impact on the opposite side of the trailer. However, when an uneven load favors one side of the trailer, the reaction spring on the overweighted side proportionally depresses, causing the overweighted side of the trailer to sag. This effect results in trailers leaning to one side when either loaded unevenly, or when the trailer is pulled around a sharp corner, which introduces a potential roll over risk and/or reduces the loading capacity of the trailer. This effect is more pronounced with taller loads or those with uneven weight distributions.

Currently, there are no commercial alternatives to the traditional independent suspension systems. Aftermarket solutions that alter vehicle suspension systems by "stiffening" the suspension springs result in improved stability and reduced lean, but these alterations come with the trade-off of a much "rougher ride."

Therefore, there is a need for a system that provides an optimum combination of load balancing capacity stability while maintaining a "smooth" ride.

SUMMARY

Certain disclosed embodiments concern a system comprising a pedal-actuated vehicle coupled to a frame, wherein the frame has at least one motorized wheel operably connected thereto, and a power source for powering the system. The pedal actuated vehicle can be, for example, a bicycle or tricycle. In certain disclosed embodiments, a control is electrically coupled to the power source and motorized wheel. Although variable, the control may be a throttle, a pedal-assist sensor, a display, or any combination thereof.

The system may further comprise a load distribution system coupled to the frame. The load distribution system typically comprises a rocker arm configured to displace a spring. Although variable, the rocker arm typically comprises a first end portion configured to engage the spring, the first end portion having a length ranging from greater than 0 inches to 55 inches; and a second end portion configured to engage the axle, the second end portion having a length ranging from greater than 0 inches to 12 inches.

Yet another disclosed embodiment of the disclosed system comprises a spring configured to be associated with a frame having an axle or to which an axle can be coupled. The spring rate can vary, depending on the needs of a user, but typically has a spring rate in the range of from greater than 0 pounds/inch to 500 pounds/inch. A rocker arm is operably associated with the axle and the spring and configured to displace the spring to act as a suspension system in response to a force applied to the rocker arm. A motorized wheel is rotatably coupled to the rocker arm. The rocker arm comprises a first end portion configured to engage the spring, and a second end portion configured to engage the axle. The length ratio of the first end portion to the second end portion ranges from 2 to 10.

A particular disclosed trailer comprises a frame having a rocker arm or to which a rocker arm can be coupled, the rocker arm configured to displace a spring to act as a suspension system in response to a force applied to the rocker arm. A power source is operably associated with the frame, and a computerized electrical system is electrically coupled to the power source. Finally, a bicycle, particularly an electrically powered bicycle, is operably associated with the trailer.

A method for using disclosed embodiments also is disclosed. The method comprises providing any of the various disclosed system embodiments and using such embodiments to electrically power a desired system, such as an electrically powered trailer or cart that delivers propulsive power to an associated cycle, such as a bicycle.

A method for mounting disclosed embodiments to an existing frame, trailer, vehicle, cycle, etc. is also disclosed. The method generally comprises attaching various disclosed components to a frame, such as trailer to electrically power the trailer. The method may further comprise mounting various components of a load distribution system to the frame, to act as a suspension system.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

I. Overview of Terms

Figure 1:
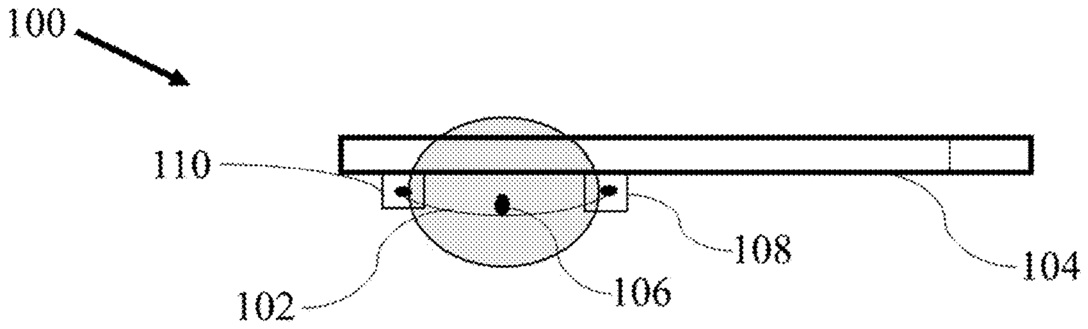
FIG. 1 is a schematic illustrating a traditional system comprising a leaf spring configuration comprising a frame, leaf spring, axle, bracket, and tire.

For purposes of this description, certain aspects, advantages, and novel features of the embodiments of this disclosure are described herein. The disclosed system and method embodiments should not be construed as being limiting in any way. Instead, the present disclosure is directed toward all novel and nonobvious features and aspects of the various disclosed embodiments, alone and in various combinations and sub-combinations with one another. The system and methods are not limited to any specific aspect or feature or combination thereof, nor do the disclosed embodiments require that any one or more specific advantages be present, or problems be solved.

Although the operations of some of the disclosed embodiments are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are readily discernible by one of ordinary skill in the art.

All features described herein are independent of one another and, except where structurally impossible, can be used in combination with any other feature described herein.

As used herein and in the claims, the singular forms "a," "an," and "the" include the plural forms unless the context clearly dictates otherwise.

The terms "includes," "has" or "haves" mean "comprises."

The term "coupled" generally means physically, mechanically, chemically, magnetically, and/or electrically coupled or linked and does not exclude the presence of intermediate elements between the coupled or associated items absent specific contrary language.

In the description, certain terms may be used such as "up," "down," "upper," "lower," "horizontal," "vertical," "left," "right," and the like. These terms are used, where applicable, to provide some description clarity when referring to relative relationships. However, these terms are not intended to imply absolute relationships, positions, and/or orientations. For example, with respect to an object, an "upper" surface can become a "lower" surface simply by turning the object over. Nevertheless, it is still the same object.

II. Introduction

The disclosed embodiments of the present disclosure concern a load distribution system, and an electrically powered wagon, frame, trailer, vehicle, or cycle. These two features are described independently below. These two features are also described in combination.

III. Load Distribution System

Figure 2:
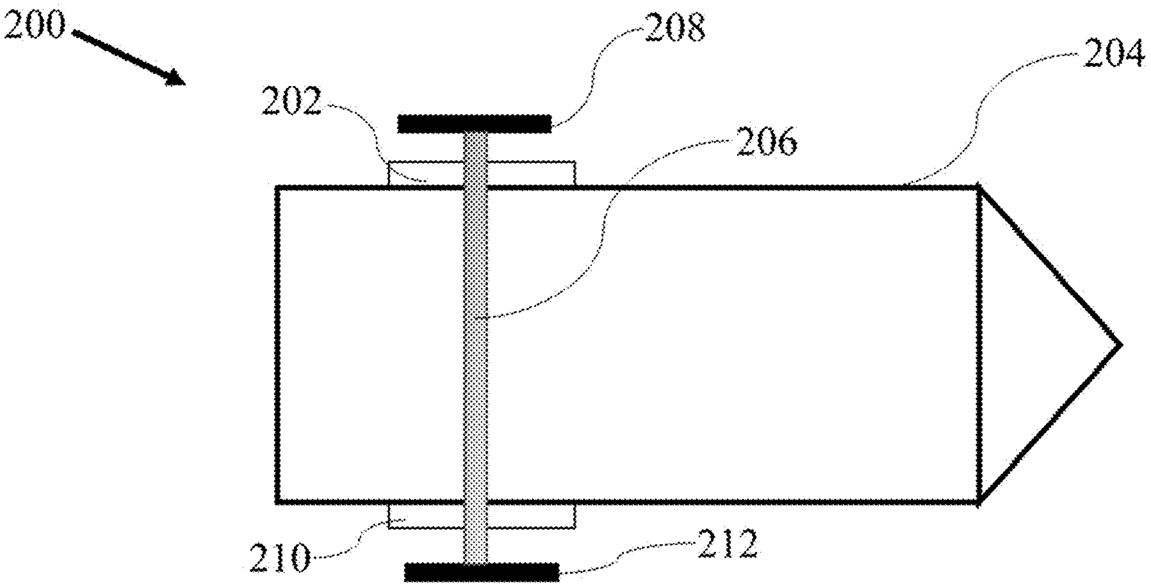
FIG. 2 is a schematic illustrating a traditional system comprising a leaf spring configuration comprising a frame, leaf spring, axle, bracket, and tire.

Conventional suspension systems use a leaf spring configuration such that each spring is mounted underneath the frame and a solid axle extends across the trailer underneath the frame. For example, FIG. 1 is a schematic illustrating a conventional suspension system comprising a leaf spring 102 mounted underneath the frame 104 and perpendicular to the axle 106, wherein the frame 104 includes a first bracket 108 and second bracket 110 for attaching the leaf spring 102. Moreover, FIG. 2 depicts a leaf spring 202 mounted underneath the frame 204 and the solid axle 206 extending from a first tire 208 and over the first leaf spring 202 across and underneath the frame 204, over a second leaf spring 210 and into a second tire 212. In view of FIGS. 1-2, each spring works independently and unevenly distributed load will introduce instability and cause the trailer to lean. Moreover, the positioning of the leaf spring(s) with the axle and underneath the frame (see FIGS. 1-2) significantly hinders the ability to lower the deck height of the trailer, as the frame height is fixed by the size of the tires and the geometry of the leaf springs, and thus eliminates the ability to lower the trailer.

On the other hand, the load distribution system disclosed herein includes a lever and a spring. The spring can be mounted on the outside of a vehicle frame. In some embodiments of the load distribution system disclosed herein, the spring is configured to be associated with the frame of a vehicle. In some embodiments, the frame may include an axle. In some aspects, the axle may be coupled to the frame. In some embodiments, the lever is a first-class lever comprising a rocker arm. The rocker arm can be operably associated with the axle and the spring and configured to displace the spring to act as a suspension system in response to a force applied to the rocker arm. In some embodiments an end portion of the rocker arm can be coupled to the spring. In other embodiments the rocker arm can be coupled to an axle. Thus, the first-class lever engages each suspension while linking opposite ends of the trailer (i.e., dependent) for load balancing and the axle of the trailer functions as a torsional spring between each side of the system and thus enabling each side to react independently when encountering obstacles. The load distribution disclosed herein is superior to traditional suspension systems because of its partially dependent and partially independent suspension system provides for improved stability while maintaining a smooth ride on uneven terrains.

Figure 3:
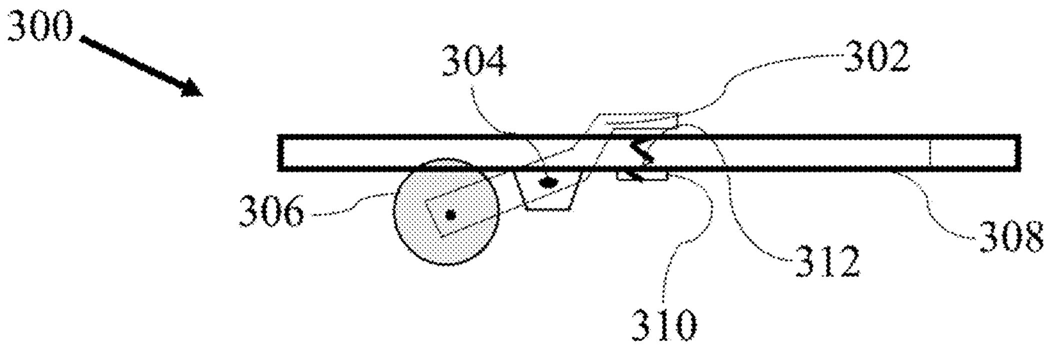
FIG. 3 is a schematic illustrating an embodiment according to the present disclosure comprising a frame, a rocker arm, axle, spring, bracket, and tire.
Figure 4:
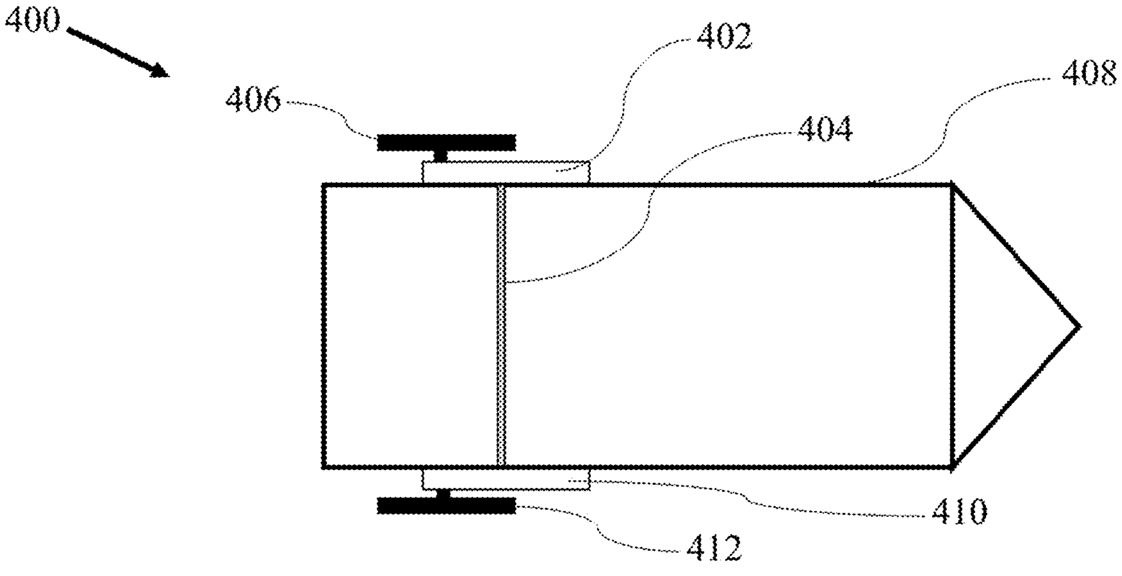
FIG. 4 is a schematic illustrating an embodiment according to the present disclosure comprising a frame, a rocker arm, axle, spring, bracket, and tire.

In some embodiments, as illustrated in FIG. 3, a vehicle may include a first-class lever comprising at least one rocker arm 302 coupled to the axle 304 and to a wheel 306. Furthermore, as shown in FIG. 3, the frame 308 may comprise at least one spring 310 mounted to the outer side of the frame 308 having a mount 312 for attaching the spring 310. Moreover, as depicted by FIG. 4, the trailer comprising a first rocker arm 402 may be attached to the axle 404 and to a first wheel 406 that extends across the frame 408 and into a second rocker arm 410. Moreover, as shown in FIG. 4, the first wheel 406 is fixedly attached to the first rocker arm 402 and a second wheel 412 is fixedly attached to the second rocker arm 410. In view of FIGS. 3-4, both rocker arms act in unison to distribute the load evenly across the one or more springs, and thus increase the stability such that if one of the springs were to be removed from the system, the other spring would still be fully functional in providing the necessary suspension. Additionally, since the spring(s) are mounted on the outside of the frame, the height of the trailer deck may be reduced as needed, which can lower the center of gravity of the load, and significantly improve the stability.

Figure 5:
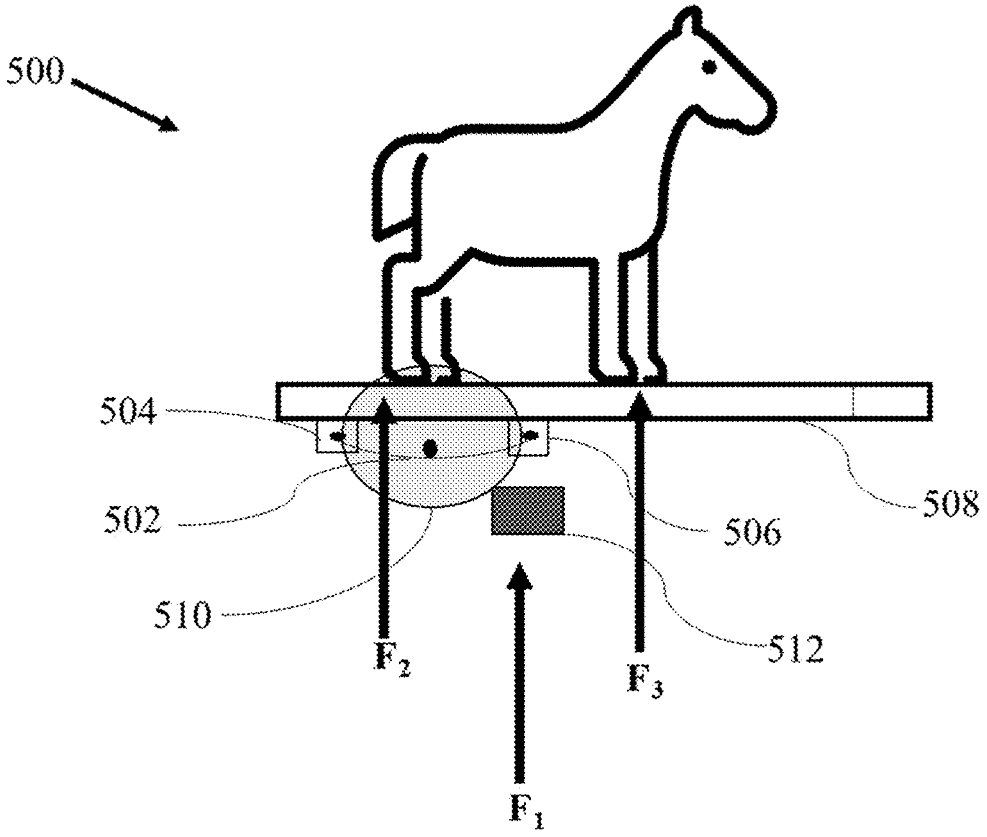
FIG. 5 is a schematic illustrating the shock loading on a leaf spring system when a wheel contacts an obstacle.
Figure 6:
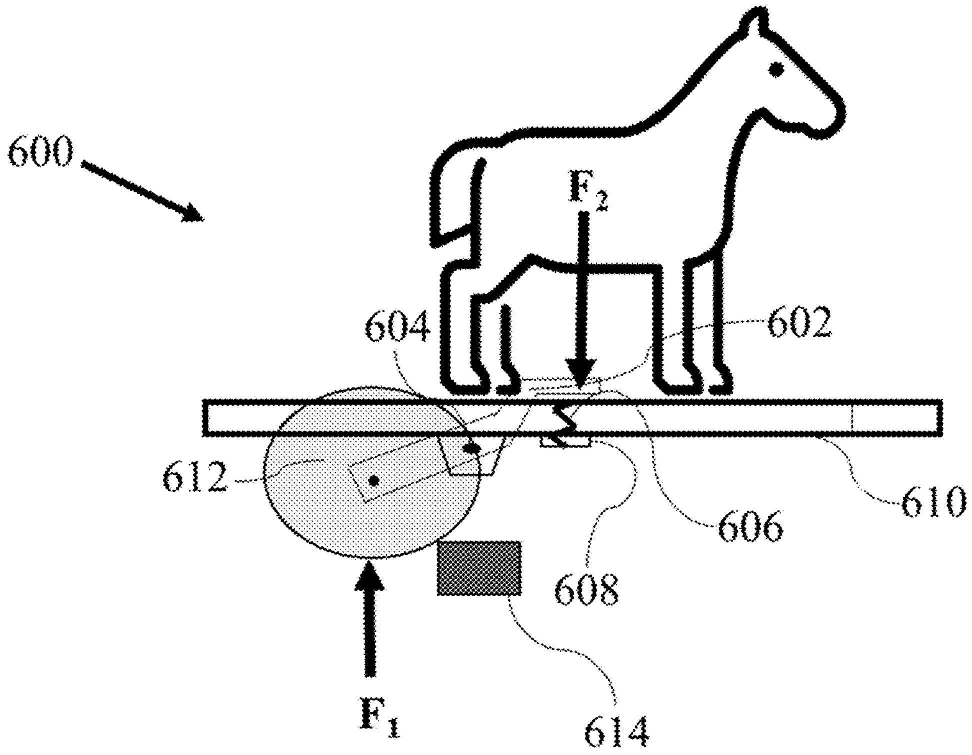
FIG. 6 is a schematic depicting an embodiment of the load distribution system disclosed herein including a rocker arm configured to an axle; and further illustrating a shock force and redirection of the shock force.

FIG. 5 illustrates the shock loading on a traditional suspension system comprising a leaf spring 502 secured by a first bracket 504 and second bracket 506 mounted onto a frame 508 of a vehicle. When a wheel 510 contacts an obstacle 512 there is a first shock force $F_1$, second shock force $F_2$, and third shock force $F_3$ in the upward direction. In contrast, FIG. 6 is a schematic of an embodiment of the load distribution system disclosed herein including a rocker arm 602 configured to an axle 604, a spring 606 that is mounted onto a mount 608 on the frame 610 of vehicle, and a wheel 612 attached to the rocker arm. In view of FIG. 6, when the wheel 612 contacts an obstacle 614, there is a shock force $F_1$ in the upwards direction; however, the shock loading of the system redirects the shock force $F_2$ in a downward direction.

The load distribution system disclosed herein can be used in vehicles such as automotive vehicles or trailers used in hauling cargo. For example, the trailers can be agricultural equipment trailers, boat trailers, personal car trailers (i.e., carriers), horse trailers, bicycle trailers, and the like. In some embodiments, the system is configured for retrofitting to an existing frame comprising at least one axle.

A. Single Axle Configuration

The load distribution system disclosed herein improves vehicle payload stability and shock resistance. The load distribution system can be configured for coupling to a vehicle having a single axle configuration, and thereby increase the ability of the system to redistribute the loading capacity relative to prior known suspension systems. In some embodiments, the load capacity can be in the range of from greater 0 pound to 10,000 pounds, such as from 0 pounds to 6,000 pounds, such as from greater than 0 pounds to 3,500 pounds, such as from greater than 0 pounds to 3,500 pounds, such as from greater than 0 pounds to 2,000 pounds.

Figure 7:
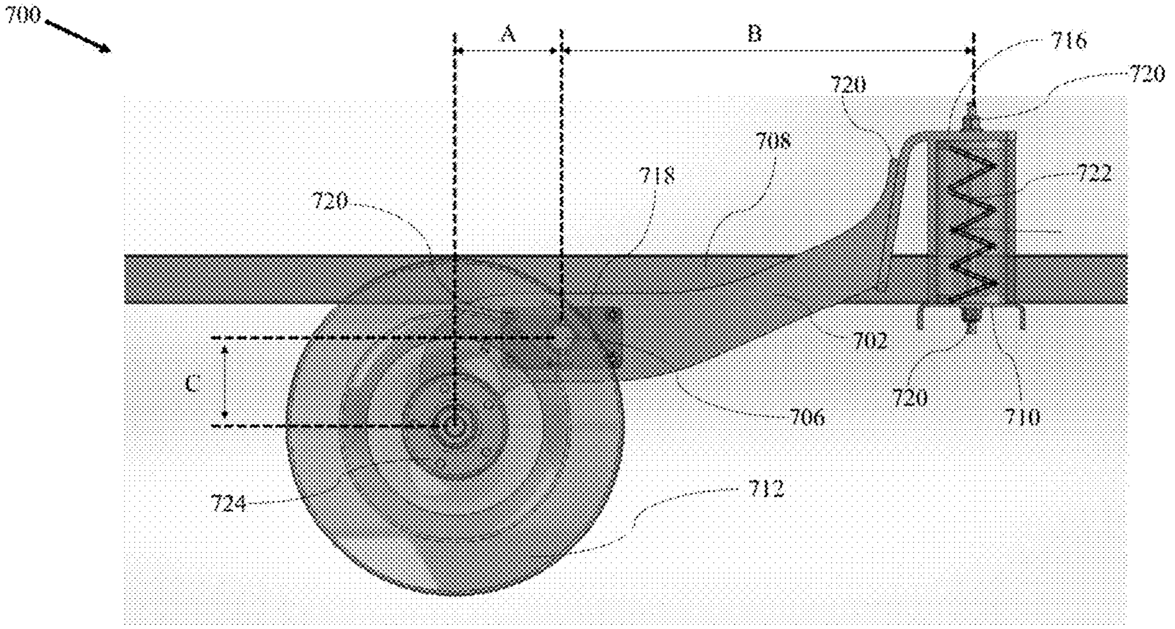
FIG. 7 is a side view of an embodiment of the load distribution system schematic comprising a single axle configuration.

In some embodiments, as shown in FIG. 7, the load distribution system 700 can be configured with a vehicle having a single axle configuration comprising a rocker arm 702 and a spring 704. In some aspects, the rocker arm can include a first end portion configured to engage the spring having length B. Furthermore, the rocker arm 702 can be coupled to an axle 706 at a second end portion of the rocker arm 702 having length A, wherein the axle 706 extends across and underneath the frame 708. The spring 704 can be coupled to the rocker arm 702 such that the spring 704 is driven by the rocker arm 702. The spring 704 can be mounted onto a mount 710 that is attached to the outer portion of the frame 708. A wheel 712 can be attached to an end portion of the rocker arm 702 opposite the spring.

In some embodiments, the rocker arm 702 is curved such that a finger 714 is formed on an end portion of the rocker arm as illustrated in FIG. 7. Moreover, the rocker arm 702 may comprise a mounting plate 716, such that the finger 714 can be attached to a mounting plate 716 for coupling the spring 704 to the rocker arm 702. Moreover, the finger 714 allows for the stress distribution at a stress concentration located in the end portion of the rocker arm. Thus, FIG. 7 illustrates an exemplary embodiment, but not limited to, a rocker arm 702 having a curved shaped and forming a finger 714 at an end portion. The finger formed at the end portion works to redistribute stress applied to the end portion of the rocker arm configured to the spring 704.

In particular disclosed embodiments, as depicted by FIG. 7, the rocker arm may include a second end portion configured to engage the axle having length A. In some embodiments, a mounting plate 718 is used to fix the rocker arm 702 against the axle 706. Fasteners 720 can be used to secure the mounting plate. In particular disclosed embodiments, the second portion having a length A can have a length in the range of from greater than 0 inch to 20 inches, such as from 2 inches to 12 inches, such as from 4 inches to 10 inches, from 5 inches to 9 inches, from 6 inches to 8 inches, or from 6 inches to 7 inches.

The spring 704 can be coupled to the first end portion having a length B. In some embodiments, the end portion having length B can have a length of greater than 0 inch to 30 inches, such as from 15 inches to 30 inches, from 20 inches to 25 inches, from 21 inches to 24 inches, or from 22 inches to 23 inches. In some aspects, the end portion of the rocker arm comprising a mounting plate includes an aperture for securing the spring. For example, a rod 722 may extend through the mount 710 attached to the outside of frame, further extend through spring 704, and extend through the aperture of the end portion of the rocker arm comprising mounting plate. The rod can be secured to both mounts via fasteners 720; thereby coupling the rocker arm to the spring.

In view of FIG. 7, in some aspects, the rocker arm may have a ratio of length B to length A. For example, the ratio of length B (inches) to length A (inches) can be a 2 to 5 length ratio (inches), such as from 2.5 to 4 length ratio (inches), or from 3 to 4 length ratio (inches).

In some embodiments, the wheel is rotatably coupled to the rocker arm. Moreover, the rocker arm may comprise a spindle for attaching the wheel 712 of the vehicle. The rocker arm may comprise the spindle at end portion opposite the spring 722. The wheel may be attached to the spindle via a hub 724 comprising at least one bearing, wherein the at least one bearing is configured to the spindle, and thereby attach the wheel 712 to the rocker arm 702. In some embodiments, the end portion comprising the spindle may have a length C, which is depicted by FIG. 7. Moreover, length C can be adjusted for a desired height because different vehicles may desire certain ground clearance and hence the placement of the spindle dictates where the tire will be placed relative to bottom portion of frame. The end portion having length C can have a length in the range of from greater than 0 inch to 15 inches, such as from 3 inches to 12 inches, from 5 inches to 10 inches, or from 6 inches to 8 inches.

In particular disclosed embodiments, the material of the rocker arm comprises steel and can have a thickness of from greater than 0 inch to 2 inches. In one exemplary embodiment, the rocker arm has a thickness of 0.75 inch. In another exemplary embodiment, the rocker arm has a thickness of 1 inch.

In some embodiments, the axle is secured to the load distribution system via a securing device. For example, the securing device can be a pin as illustrated in FIG. 7, wherein a hitch pin 726 secures the axle to the rocker arm 702.

Figure 8:
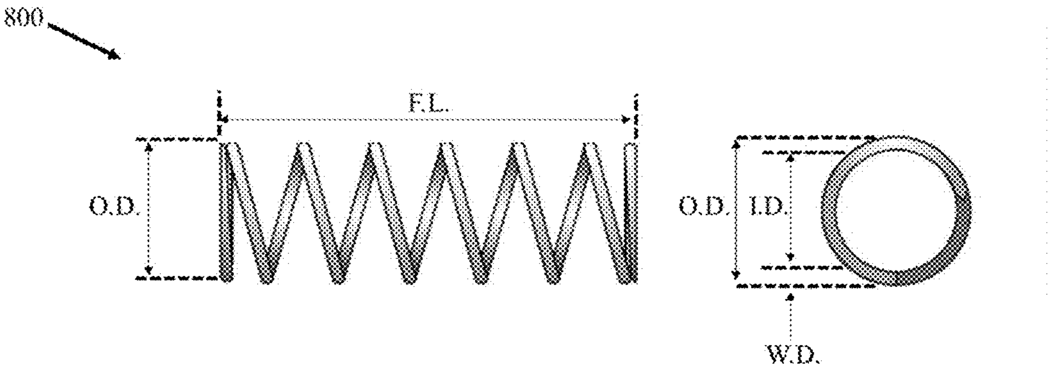
FIG. 8 depicts certain spring dimensions for an embodiment of a disclosed load distribution system.

FIG. 8 is a schematic of a spring 800, illustrating a Free Length, an Outside Diameter, an Inside Diameter, and a Wire Diameter. In some embodiments, the free length (F.L.) can have a range of from greater than 0 inch to 25 inches, such as from 5 inches to 20 inches, or from 10 inch to 20 inches. In some embodiments the spring can have an outside diameter (O.D.) of from greater than 0 inch to 10 inch, such as from 2 inches to 8 inches, or from 4 inches to 6 inches In some embodiments, the spring can have an inside diameter (I.D.) of from greater than 0 inch to 10 inch, such as from 2 inches to 8 inches, or from 4 inches to 6 inches In some embodiments, the spring can have a wire diameter (W.D.) from greater than 0 in to 2 in, such as from greater than 0 inch to 1.5 inches, from greater than 0 inch to 1 inch, from greater than 0 inch to 0.5 inch.

When a wheel encounters an obstacle, the wheel moves in the upward direction, and thus acting across the rocker arm which compresses the spring and hence the spring acts as a form of suspension for the wheel because the spring pushes on the rocker arm and actuates the wheel. In view of this, springs having a spring rate in pound/inch (k) can be selected according to the desired capacity. In some embodiments, the spring rate can have a range of from 50 pound/inch to 500 pound/inch. In one exemplary embodiment, the spring has a spring rate of 96 pound/inch. In another exemplary embodiment, the spring has a spring rate of 195 pound/inch. In yet another exemplary embodiment, the spring has a spring rate of 353 pound/inch.

In certain specific embodiments, the length A (see FIG. 7), length B (see FIG. 7), and the spring rate are indicated below in Table 1.

TABLE 1

| Trailer/Vehicle/Frame* Capacity (pounds) | Length A (inches) | Length B (inches) | Spring Rate, k (pound/inches) |
|---|---|---|---|
| 2,000 | 6.25 | 23 | 96 |
| 3,500 | 6 | 23.5 | 195 |
| 6,000 | 6.5 | 25.5 | 353 |

*Trailer/vehicle/frame are exemplary, non-limiting embodiments of the components to which the load distribution system can be operably associated with.

Figure 9:
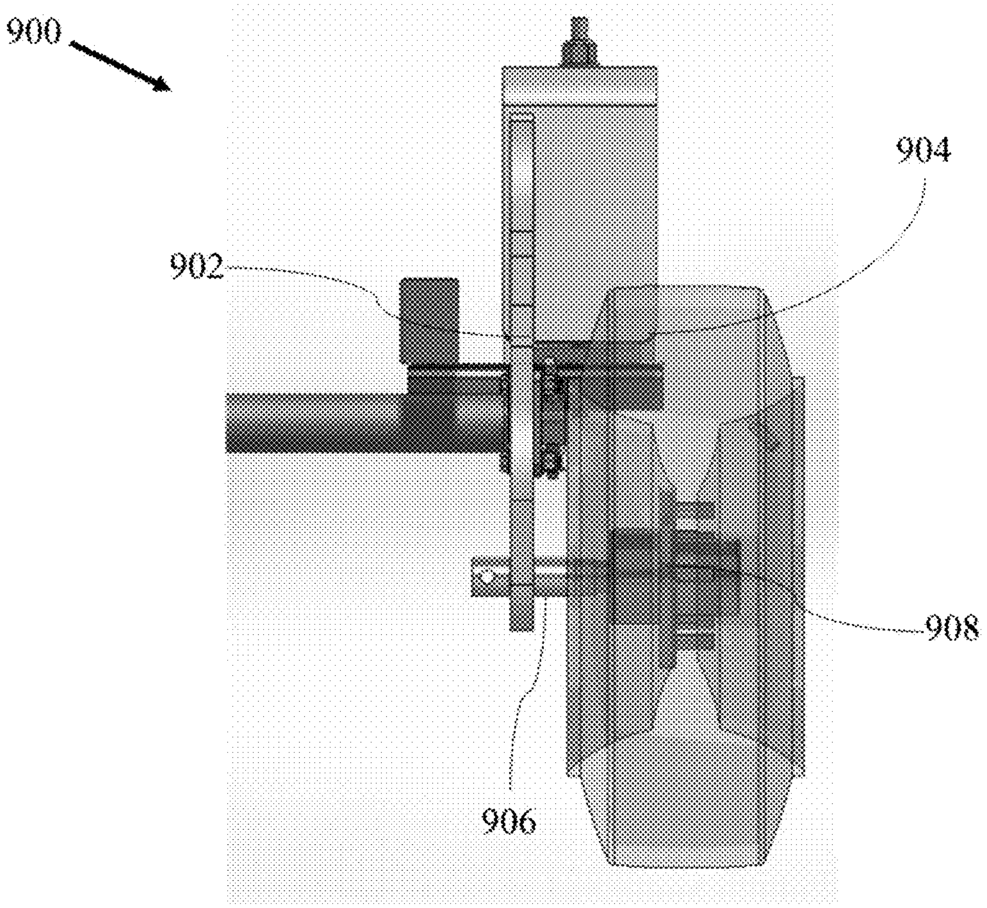
FIG. 9 is a rear view of an embodiment of the load distribution system comprising a single axle configuration.

In some embodiments, the load distribution system may include a rocker arm and may comprise a spindle at an end portion opposite the spring. FIG. 9 illustrates an embodiment of a load distribution system 900 comprising a rocker arm 902 attached to a wheel 904. The rocker arm 902 comprises a spindle 906 configured to a hub 908, wherein the hub 908 may be configured with at least one bearing. Thus, the wheel 904 may be attached to the spindle 906 via a hub 908 comprising at least one bearing, wherein at least one bearing is configured to the spindle 906, and thereby attach the wheel 904 to the rocker arm 902.

As previously discussed, axles on the market are fixed rigid axles—do not twist or rotate—and thus each side of the vehicle only includes independent suspension. On the other hand, the present disclosure comprises a non-rigid axle extending across the frame and pivots via the rocker arms. In some embodiments, the rocker arm may include at least one aperture through the second end portion of the rocker arm to provide clearance for a sleeve bearing that comprises a housing that the axle is placed into. In particular disclosed embodiments, the sleeve bearing is a pressure fit sleeve bearing. Thus, the axle is inserted into housing and extends inside the sleeve and is supported by the sleeve bearing.

Figure 10:
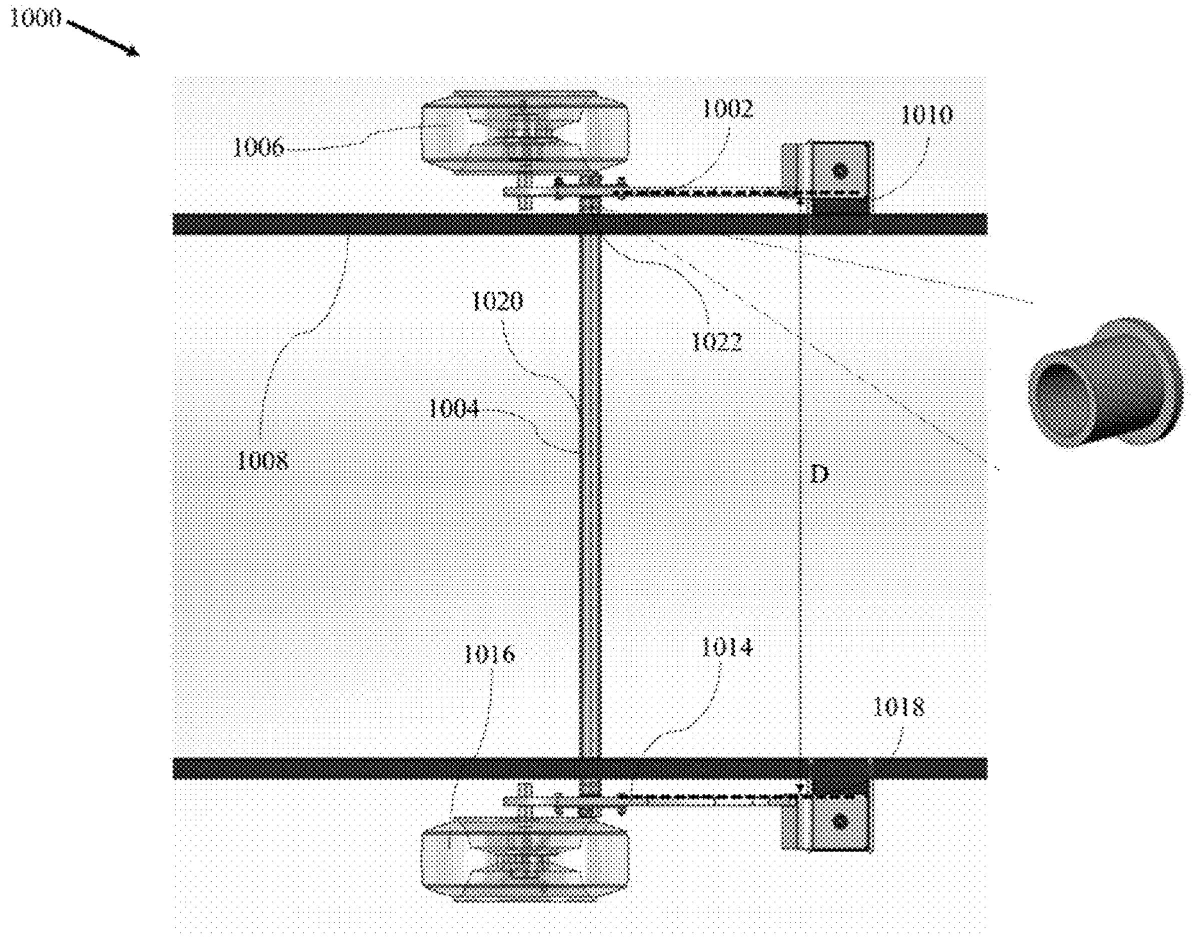
FIG. 10 is top view of an embodiment of the load distribution system comprising a single axle configuration.

FIG. 10 illustrates a top view of an embodiment of the load distribution system disclosed herein 1000, wherein a first rocker arm 1002 is attached to the axle 1004 and to a first wheel 1006, wherein the axle 1004 extends across and underneath the frame 1008. The first rocker arm 1002 is attached to a first end of a spring (not shown). A first mount 1010 is attached to the outside of the frame 1008 for mounting the second end of the spring. Moreover, the axle 1004 is attached to a second rocker arm 1014, and thereby links the first rocker arm 1002 to the second rocker arm 1014. The second rocker arm 1014 is attached to a second wheel 1016 and to a first end of a second spring (not shown), wherein the frame 1008 comprises a second mount 1018 for attaching a second end of the second spring. Thus, the axle 1004 links both the first rocker arm 1002 and the second rocker arm 1004. However, the axle 1004 is not truly rigid and thus both tires act in unison. As such, the dependent nature reduces the leaning of the trailer when on an offset road or crosswind; but remains independent. Therefore, the axle in the load distribution system described herein can be a torsion axle for suspension performance.

The axle can have a diameter in the range of from greater than 0 inch to 5 inches, such as from greater than 0 inch to 3 inches, greater than 0 inch to 2 inches, from 1 inch to 2 inches, from 1 inch to 1.9 inches, from 1 inch to 1.8 inches, from 1 inch to 1.7 inches, from 1 inch to 1.6 inches, from 1 inch to 1.5 inches, from 1 inch to 1.4 inches, from 1 inch to 1.3 inches from 1 inch to 1.2 inches, or from 1 inch to 1.1 inches.

In some embodiments, length D, as shown in FIG. 10, can have a length in the range of from greater than 0 feet to 15 feet, such as from 3 feet to 12 feet, from 5 feet to feet, or from 6 feet to 8 feet to accommodate for the width of the vehicle. In some embodiments, the axle can have a diameter of from 0.75 inch to 3 inches, such as from 0.75 inch to 2.5 inches, from 0.75 inches to 3.0 inches, from 1.0 inch to 3.0 inches.

In particular disclosed embodiments, the axle is placed through a receiver 1020, which operates as a cover for the axle 1004. In some embodiments, the receiver 1020 is a hollow pipe that is attached to the underside/bottom of the frame perpendicular to the wheels. In some embodiments, the receiver 1020 can be attached to the frame via welding.

Figure 11:
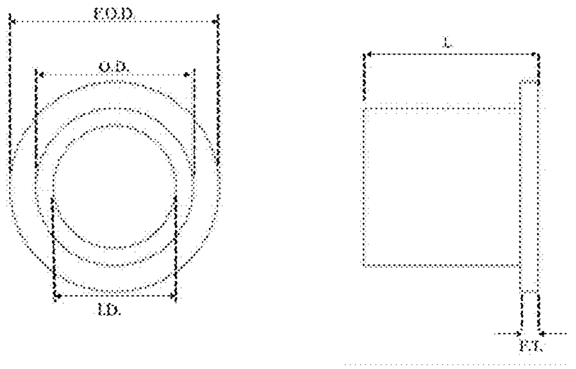
FIG. 11 illustrates the dimensions of an embodiment of a pressure fit bearing, depicting certain dimensions for a disclosed embodiment of a load distribution system.

Moreover, FIG. 10 depicts a sleeve bearing 1022 attached to the end of the receiver. Thus, the axle extends into the sleeve bearing and is thereby supported by the sleeve bearing. FIG. 11 is a schematic (left) illustrating the flange outer diameter (F.O.D.), outer diameter (O.D.), and inner diameter (I.D.); and a schematic (right) illustrating length (L) and flange thickness (F.T.). In some embodiments, the flange outer diameter can be in the range from greater than 0 inch to 5 inches, such as from 1 inch to 4 inches, 1 inch to 3 inches, or 1 inch to 2 inches In some embodiments, the outer diameter can be in the range from greater than 0 inch to 5 inches, such as from 1 inch to 4 inches, 1 inch to 3 inches, or 1 inch to 2 inches In other aspects, the inner diameter can have a range from greater than 0 inch to 5 inches, such as from 1 inch to 4 inches, 1 inch to 3 inches, or 1 inch to 2 inches. In other particular disclosed embodiments, the length of the sleeve bearing can be in the range of from 0 inch to 5 inches, such as from 1 inch to 4 inches, 1 inch to 3 inches, or 1 inch to 2 inches In some embodiments, the flange thickness can be in the range of from greater than 0 inch to 1 inch, such as from greater than 0 inch to 0.8 inch, from greater than 0 inch to 0.6 inch, from greater than 0 inch to 0.4 inch, from greater than 0 inch to 0.3 inch, from greater than 0 to 0.2 inch, or from greater than 0 to 0.1 inch.

In particular disclosed embodiments, the material of the sleeve bearing is a metal or metal alloy. For example, the metal can be 863 iron-copper, iron-copper, or bronze. In some embodiments, the sleeve bearing is an oil embedded sleeve bearing and thus self-lubricates. The oil can be a lubricant such as a natural oil (e.g., mineral or vegetable oils) or synthetic base oils, or blends thereof. For example, the lubricant can be SAE 90 oil, ISO 460 oil, or SAE 20 oil. As a result, the oil embedded sleeve bearings allow for the rocker arms to pivot, which allows for the axle to pivot with the rocker arms.

In some embodiments, the sleeve bearing may have a sleeve bearing radial capacity in the range of 3,000 pounds to 15,000, such as from 3,000 pounds to 4,000 pounds, from 5,000 pounds to 6,000 pounds, from 6,000 pounds to 7,000 pounds, from 7,000 pounds to 8,000 pounds, from 8,000 pounds to 9,000 pounds, from 9,000 pounds to 10,000 pounds, from 10,000 to 11,000 pounds, from 11,000 pounds to 12,000 pounds, from 12,000 pounds to 13,000 pounds, from 13,000 pounds to 14,000 pounds to 15,000 pounds In certain specific aspects, the values are as indicated below in Table 2.

TABLE 2

| Trailer/Vehicle/Frame* Capacity (pounds) | Axle Diameter (inches) | Minimum Sleeve Bearing Radial Capacity (pounds) |
|---|---|---|
| 2,000 | 1.375 | 3,800 |
| 3,500 | 1.50 | 6,590 |
| 6,000 | 1.75 | 11,200 |

*Trailer/vehicle/frame are exemplary, non-limiting embodiments of the components to which the load distribution system can be operably associated with.

Figure 12:
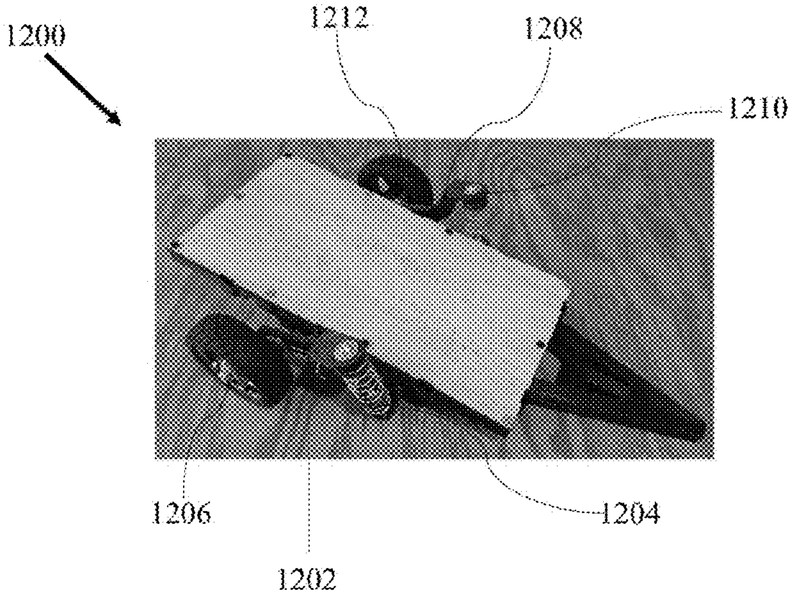
FIG. 12 is an image of an exemplary embodiment of the load distribution system comprising a single axle configuration.

FIG. 12 is another image of an exemplary embodiment of the load distribution system 1200 disclosed herein. The first rocker arm 1202 having a first end portion configured to engage a first spring 1204 and a second end portion configured to engage the axle. Moreover, the first rocker 1202 arm is rotatably coupled to a first wheel 1206. The second rocker arm 1208 having a first end portion configured to engage a second spring 1210 and a second end portion configured to engage the axle. The second rocker arm is rotatably coupled to a second wheel 1212. The first rocker arm 1202 and second rocker arm 1208 displace the first spring 1204 and second spring 1206 to act as a suspension system in response to application of a force to either the first wheel 1206 or the second wheel 1212.

Figure 13:
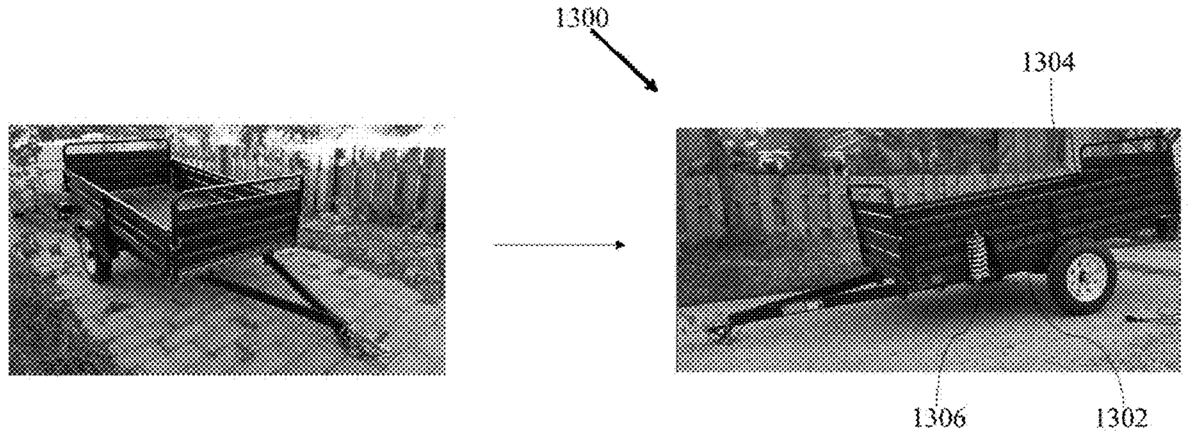
FIG. 13 is an image of a pre-modified trailer (left) and an image of an exemplary embodiment of the load distribution system comprising a modified trailer having a single axle configuration (right).

FIG. 13 is an image of an exemplary embodiment of the load distribution system disclosed 1300 herein configured for retrofitting to an existing frame (left) having a single axle configuration. FIG. 13 shows a rocker arm 1302 attached to a wheel 1304 and a spring 1306. The spring mounted onto a mount on the outside of the existing frame.

Figure 14:
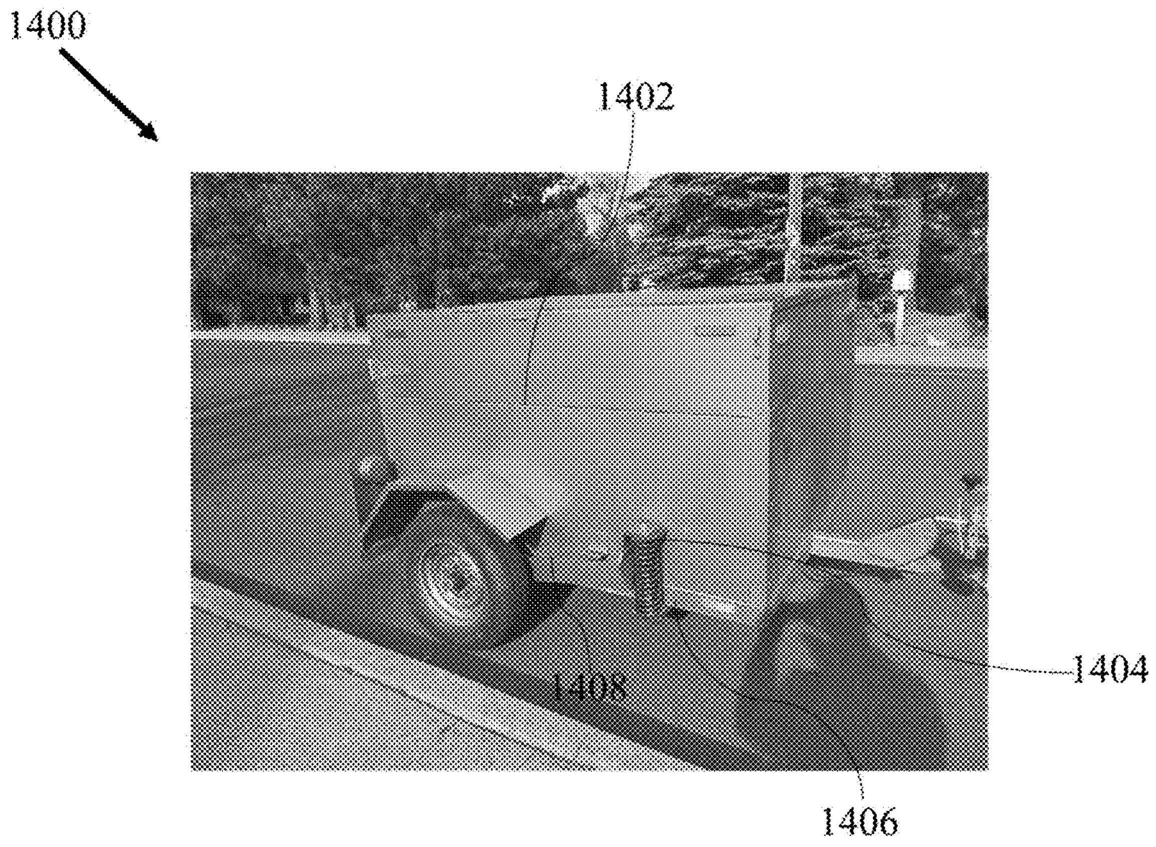
FIG. 14 is an image of an exemplary embodiment of the load distribution system comprising a single axle configuration.

FIG. 14 is an image illustrating another exemplary embodiment of the load distribution system disclosed 1400 herein configured for retrofitting to a closed trailer 1402 having a single axle. A spring is 1404 is configured to be associated with a frame 1406 having an axle (not shown). The rocker arm 1408 is operably associated with the axle and the spring 1404. Moreover, the axle is configured to displace the spring to act as a suspension system in response to a force applied to the rocker arm.

B. Tandem Axle Configuration

In some embodiments, the load distribution system disclosed herein can be configured with a vehicle having a tandem axle configuration, and further increase the loading capacity relative to the single axle configuration. In particular disclosed embodiments, the load distribution system disclosed herein is configured for retrofitting to an existing frame comprising at least two axles.

Figure 15:
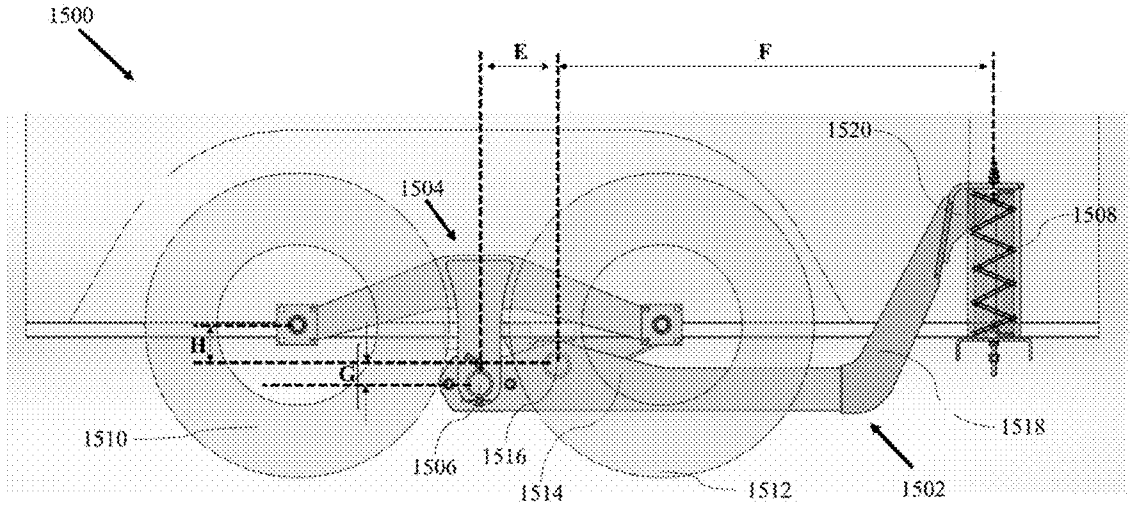
FIG. 15 is a schematic side view illustrating an embodiment of a load distribution system comprising a tandem axle configuration.

In some aspects of the particular disclosed invention, the load distribution system comprising a tandem axle configuration may further include an equalizer. In particular disclosed embodiments, the rocker arm can be attached to the equalizer. In some embodiments, the load capacity can be in the range of greater than 0 pounds. to 10,000 pounds, such as from 2,000 pounds to 10,000 pounds, from 3,000 pounds to 9,000 pounds, from 4,000 pounds to 8,500 pounds, from 5,000 pounds to 8,000 pounds, or from 6,000 pounds to 8,000 pounds In some embodiments, as depicted in FIG. 15, the load distribution system 1500 may include a rocker arm 1502 is attached to the equalizer 1504. The rocker arm 1502 also configured to the axle 1506 and to a spring 1508. Furthermore, the equalizer 1504 is attached to a first wheel 1510 and a second wheel 1512.

In particular disclosed embodiments, the tandem axle configuration of the load distribution system disclosed herein does not add any additional width than the traditional suspension systems. Thus, the equalizer may comprise a plurality of components (i.e., multi-pieced) such that it suits the spaces provided between the wheels of the trailer and the side of the frame of the trailer. For example, the rocker arm may comprise a first component 1514, wherein the first component comprises a pivot point 1516 of the equalizer and a portion for attaching the axle 1506. The equalizer provides a pivot point 1516 such that the wheels can move in the upwards and in the longitudinal direction and downwards in the longitudinal direction relative to each other. For example, if the trailer encounters an obstacle on the front wheel, the rear wheel will still move down and contact the ground. Moreover, the equalizer safeguards that the force applied on the front wheel is the same force as the force being carried on the rear wheel because it naturally pivots.

The rocker arm may comprise a second component 1518 operable associated with the axle 1506. Additionally, the rocker arm 1502 may comprise a third component 1520 attached to the bottom of the end portion of the rocker arm 1502. In some embodiments, the third component 1520 includes a gusset providing additional support to the frame while also stiffening the mount for securing the spring as depicted in FIG. 15. In one exemplary embodiment, the third component 1520 is a triangular shaped gusset angled at 45°.

The rocker arm can have a thickness of from greater than 0 inch to 5 inches, such as from greater than 0 inch to 4 inches, from greater than 0 inch to 3 inches, from greater than 0 inch to 2 inches, or from greater than 0 inch to 1 inch. In view of FIG. 15, the rocker arm may comprise a second end portion operable associated with an axle having a length E. In some aspects, length E can have a length in the range of 5 inches to 10 inches. In some embodiments, the rocker arm may comprise a first end portion configured to engage with the spring. In particular disclosed embodiments, the first end portion can have a length F in the range of 35 inches to 55 inches.

In some embodiments, rocker arm may comprise a length ratio of a second portion to a first portion. For example, the ratio can be a ratio of length F (inches) to length E (inches). The ratio of length F to length E can be in the range of from 4 to 10, such as from 5 to 9, from 5 to 8, from 5 to 7, or from 5 to 6.

When a wheel encounters an obstacle, the wheel moves in the upward direction, and thus acts across the rocker arm, which compresses the spring and hence the spring acts as a form of suspension for the wheel because the spring pushes on the rocker arm and actuates the wheel. In view of this, springs having a spring rate in pound/inch (k) can be selected according to the desired capacity. In some embodiments, the spring rate can have a range of from 50 pounds/inch to 500 pounds/inch, such as from 200 pounds/inch to 400 pounds/inch.

In certain specific aspects, the values are as indicated below in Table 3.

TABLE 3

| Trailer/Vehicle/Frame* Capacity (pounds) | Length E (inches) | Length F (inches) | Spring Rate (k) (pound/inch) |
|---|---|---|---|
| 7,000 | 7.25 | 40.75 | 238 |

*Trailer/vehicle/frame are exemplary, non-limiting embodiments of the components to which the load distribution system can be operably associated with.

In view of FIG. 15, the spindle on the equalizer may comprise a length H such that it can be adjusted according to a desired height because different vehicles may desire certain ground clearance and hence the placement of the spindle dictates where the tire will be placed relative to bottom portion of frame. Moreover, length H is also determined according to distance from the axle in longitudinal direction. Thus, length H as shown in FIG. 15, can have a length in the range of from greater than 0 inch to 15 inches, such as from 3 inches to 12 inches, from 5 inches to 10 inches, or from 6 inches to 8 inches.

The equalizer may pivot on the pivot joint to equalize the load forces on the load distribution system disclosed herein. In some embodiments, the pivot joint on the equalizer is placed at an end portion of the rocker arm. In some embodiments, the end portion can have a length G, wherein length G can have a range of from greater than 0 inch to 15 inches, such as from 3 inches to 12 inches, from 4 inches to 10 inches, from 4 inches to 8 inches, or from 4 inches to 6 inches.

Figure 16:
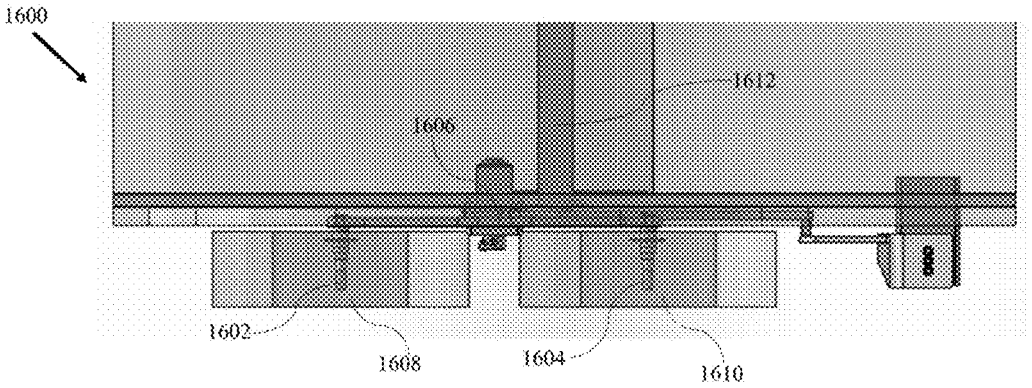
FIG. 16 is a top schematic view illustrating an embodiment of a load distribution system comprising a tandem axle configuration.

FIG. 16 is a schematic illustrating one side of an embodiment of the load distribution system 1600 disclosed herein, showing a first spindle 1602 and a second spindle 1604 attached the equalizer 1606. The first wheel 1608 is attached to the first spindle 1602; and a second wheel 1610 is attached to the second spindle 1604. The axle 1612 is configured to the rocker arm (not shown). The axle 1612 can have a diameter in the range of from greater than 0 inch to 5 inches, such as from greater than 0 inch to 3 inches, greater than 0 inch to 2 inches, from 1 inch to 2 inches, from 1 inch to 1.9 inches, from 1 inch to 1.8 inches, from 1 inch to 1.7 inches, from 1 inch to 1.6 inches, from 1 inch to 1.5 inches, from 1 inch to 1.4 inches, from 1 inch to 1.3 inches from 1 inch to 1.2 inches, or from 1 inch to 1.1 inches. In particular disclosed embodiments, the axle is placed through a receiver. The receiver operates as a cover for the axle, which can be a hollow pipe that is attached to the underside/bottom of the frame perpendicular to the first wheel 1608 and second wheel 1610. In some embodiments the receiver can be attached to the frame.

The axle extends into the sleeve bearing and is thereby supported by the sleeve bearing. In some embodiments, the flange outer diameter can be in the range from greater than 0 inch to 5 inches, such as from 1 inch to 4 inches, 1 inch to 3 inches, or 2 inches to 3 inches In some embodiments, the outer diameter can be in the range from greater than 0 inch to 5 inches, such as from 1 inch to 4 inches, 1 inch to 3 inches, or 2 inches to 3 inches The inner diameter can have a range from greater than 0 inch to 5 inches, such as from 1 inch to 4 inches, 1 inch to 3 inches, or 2 inches to 3 inches. The length of the sleeve bearing can be in the range of from 0 inch to 5 inches, such as from 1 inch to 4 inches, 1 inch to 3 inches, or 2 inches to 3 inches In some embodiments, the flange thickness can be in the range of from greater than 0 inch to 1 inch, such as from greater than 0 inch to 0.8 inch, from greater than 0 inch to 0.6 inch, from greater than 0 inch to 0.4 inch, from greater than 0 inch to 0.3 inch, from greater than 0 inch to 0.2 inch, or from 0.1 inch to 0.2 inch.

In particular disclosed embodiments, the material of the sleeve bearing is a metal or metal alloy. For example, the metal can be 863 iron-copper, iron-copper, or bronze. In some embodiments, the sleeve bearing is an oil embedded sleeve bearing and thus self-lubricates. The oil can be a lubricant such as a natural oil (e.g., mineral or vegetable oils) or synthetic base oils, or blends thereof. For example, the lubricant can be SAE 90 oil, ISO 460 oil, or SAE 20 oil. As a result, the oil embedded sleeve bearings allow for the rocker arms to pivot, which allows for the axle to pivot with the rocker arms.

In some embodiments, the sleeve bearing may have a sleeve bearing radial capacity in the range of 10,000 pounds to 40,000 pounds, such as from 11,000 pounds to 30,000 pounds, from 11,000 pounds to 25,000 pounds, from 11,000 pounds to 22,000 pounds, from 12,000 pounds to 21,500 pounds, from 12,000 pounds to 21,000 pounds, or from 12,000 pounds to 20,000 pounds.

In certain specific aspects, the values are as indicated below in Table 4.

TABLE 4

| Trailer/Vehicle/Frame* Capacity (pounds) | Axle Diameter (inches) | Minimum Sleeve Bearing Radial Capacity (pounds) |
|---|---|---|
| 7,000 | 2 | 12,300 |

*Trailer/vehicle/frame are exemplary, non-limiting embodiments of the components to which the load distribution system can be operably associated with.

Figure 17:
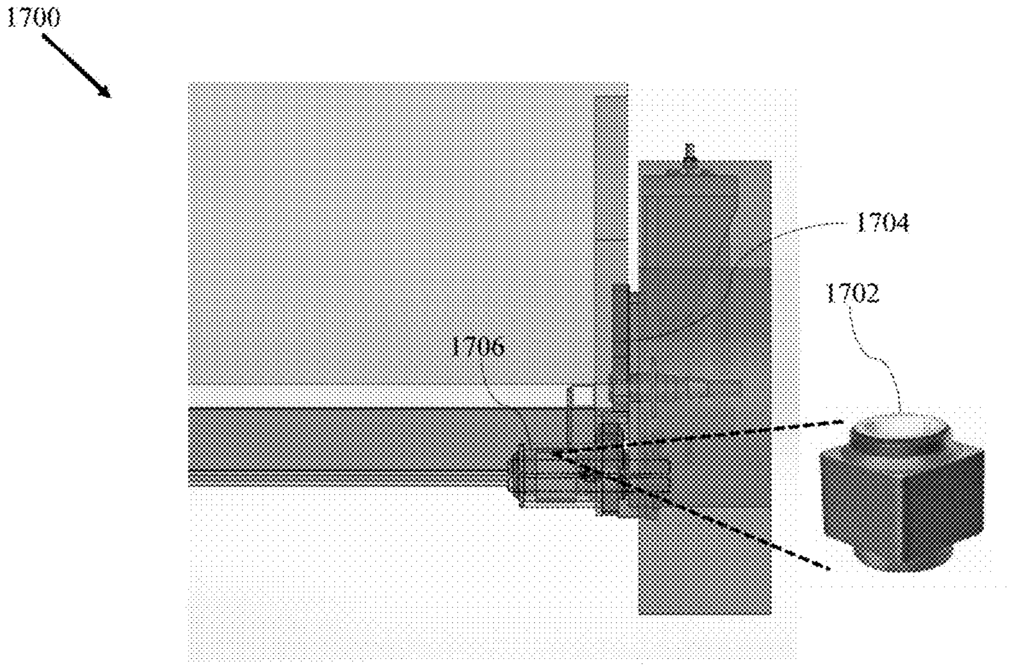
FIG. 17 is a schematic rear view illustrating an embodiment of a load distribution system comprising a tandem axle configuration.
Figure 18A:
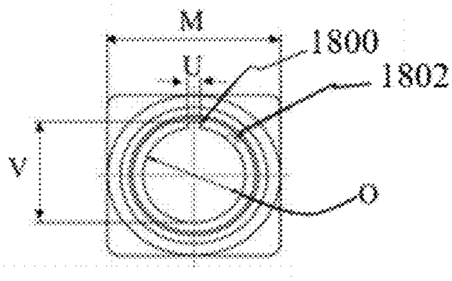
FIGS. 18(*a*)-(*d*) are schematic drawings illustrating the dimensions of an embodiment of a disclosed for use with a disclosed load distribution system.
Figure 18B:
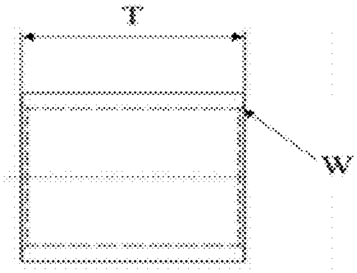
Figure 18C:
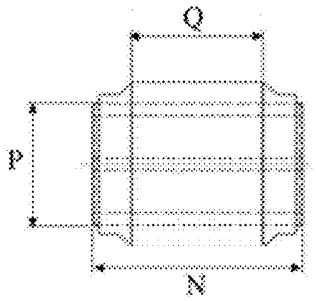
Figure 18D:
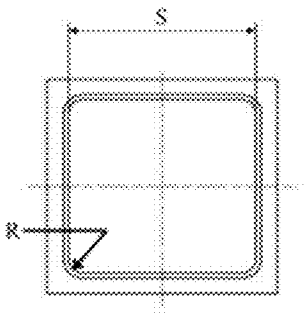

To control the wheels from pivoting too far up into the underside and/or backside of the vehicle fender, the load distribution system disclosed 1700 herein may include a bushing to provide a counter torque and thus keep the tires aligned. FIG. 17 depicts the bushing 1702 mounted on the backside of the equalizer 1704. The bushing 1702 can be configured such that it provides some resistance to twisting and pivoting and hence the equalizer will pivot on the joint and equalize the load forces.

In some embodiments, a housing 1706 comprising the bushing 1702 is attached to the equalizer 1704 on the backside of the pivot joint for mounting the bushing 1702. FIG. 17 illustrates the housing 1706, wherein the bushing 1702 is mounted inside of the housing 1706. The bushings can be loaded radially and utilize a soft torsional spring rate to provide freedom in rotation. Moreover, the bushings combine the torsional spring with an elastomeric pivot and isolator and hence provide positive torsional positioning and pivot action.

In some embodiments the bushings are square-bonded bushings. In particular disclosed embodiments, the square-bonded bushings may comprise rubber 1800 depicted in FIGS. 18(*a*)-18(*d*). FIG. 18(*a*) is a schematic of a top view of a square-bonded bushing comprising rubber illustrating the part dimensions, wherein length M can have a range of from greater than 0 inch to 5 inches, such as 1 inch to 4 inches, 2 inches to 4 inches, or 3 inches to 4 inches. In some embodiments, length U can have a range of from greater than 0 inch to 5 inches, such as from 1 inch 4 inches, from 1 inch to 3 inches, or from 1 inch to 2 inches. In some embodiments, length V can have a range of from greater than 0 inch to 5 inches, such as from 1 inch to 4 inches, from 1 inch to 3 inches, or from 1 inch to 2 inches. In other aspects, length O can have a range of from greater than 0 inch to 5 inches, such as from 1 inch to 4 inches, from 1 inch to 3 inches, or from 1 inch to 2 inches. Moreover, in some embodiments, a key 1802 can be configured to the rubber square-bonded bushing as depicted in FIG. 18(*a*). In other embodiments, a key 1804 can be configured to the rubber bushing at 45° from vertical as shown in FIG. 18(*a*). FIG. 18(*b*) is a schematic of a side view of a square-bonded bushing further illustrating the dimensions, wherein length Q can have a range of from greater than 0 inch to 5 inches from 1 inch to 4 inches, from 1 inch to 3 inches, or from 1 inch to 2 inches. In some embodiments, length P can have a range of from greater than 0 inch to 5 inches, such as from 1 inch to 4 inches, 1 inch to 3 inches, or 1 inch to 2 inches. In some embodiments, length N can have a range of from greater than 0 inch to 6 inches such as from 1 inch to 5 inches, 2 inches to 5 inches, 2 inches to 5 inches, 3 inches to 5 inches, or from 4 inches to 5 inches.

FIG. 18(*c*) is a schematic illustrating the dimensions of a housing configured around the rubber square-bonded bushing, wherein length T can have a range of from greater than 0 inch to 5 inches, such as from 1 inch to 4 inches, from 1 inch to 3 inches, or from 1 inch to 2 inches. In some embodiments, length W can have a range of from greater than 0 inch to 1 inch, such as from 0.01 inch to 0.1 inch, or from 0.05 inch to 0.1 inch. Thus, length T and length J help illustrate dimensions of the socket such that the rubber square-bonded bushing presses inside and appropriately secured. Similarly, FIG. 18(*d*) illustrates the dimensions of the socket to properly secure the rubber square-bonded bushing, wherein length S can have a range of from 0 inch to 5 inches, such as from 1 inch to 4 inches, 2 inches to 4 inches, or from 3 inches to 4 inches; and R can have a maximum of 0.25 inches.

Figure 19:
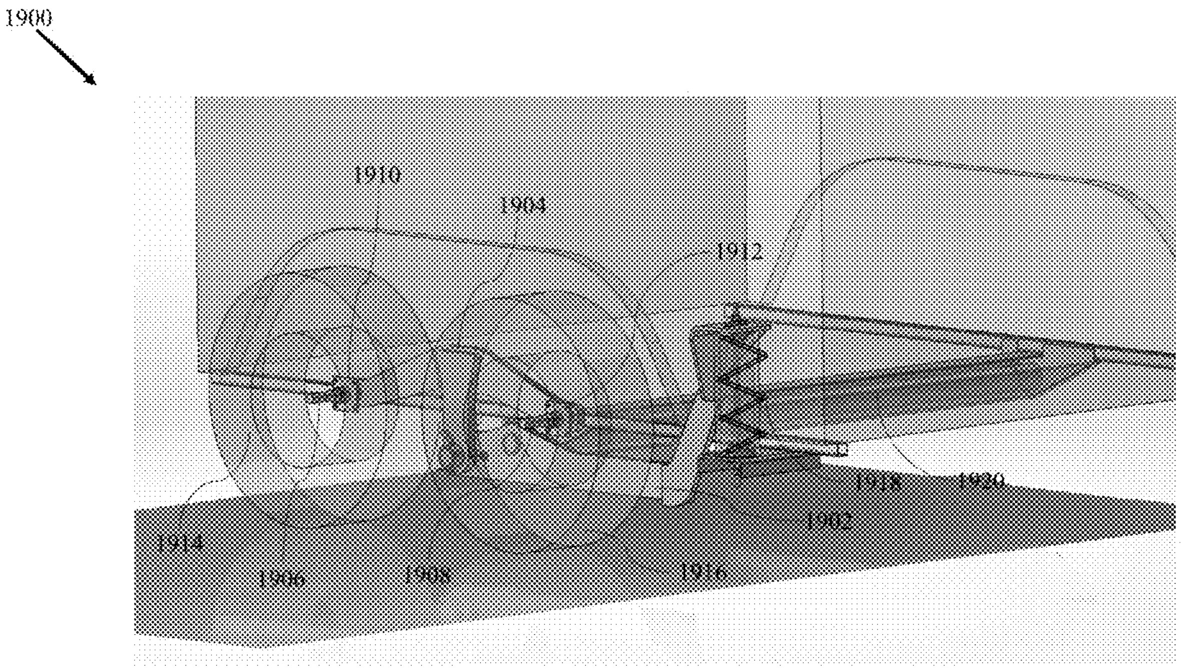
FIG. 19 is a perspective side elevational schematic view illustrating an embodiment of a load distribution system comprising a tandem axle configuration.

Larger capacity vehicles, such as trailers comprising a tandem axle configuration may include brakes. In particular disclosed embodiments, the load distribution system disclosed herein may include at least one square plate mount for such trailers. FIG. 19 illustrates the rocker arm 1902 attached to an equalizer 1904 having a first spindle 1906 and second spindle 1908, wherein a first square plate mount 1910 is configured to the first spindle 1906 and the second square plate mount 1912 is configured to the second spindle 1908. Moreover, FIG. 19 depicts a first wheel 1914 rotatably coupled to the equalizer 1904 via the first spindle 1906 and a second wheel 1916 rotatably coupled to the equalizer 1904 via the second spindle 1908. Furthermore, the rocker arm 1902 may displace a spring 1918 to act as a suspension system in response to the application of a force to the first wheel 1914 and second wheel 1916. FIG. 19 shows an axle inserted through a receiver 1920, which is configured for receiving the axle there through.

Figure 20:
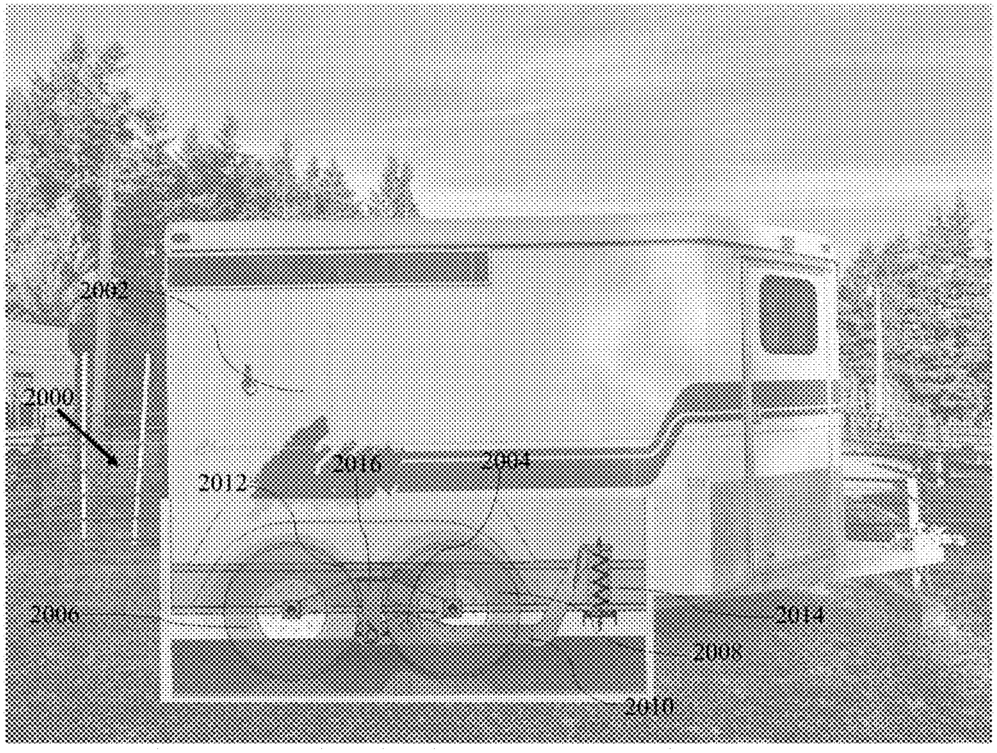
FIG. 20 is an image of an embodiment of a load distribution system configured to a tandem axle trailer.

FIG. 20 illustrates a side view of an exemplary embodiment of load distribution system disclosed herein configured to a trailer comprising a tandem axle configuration 2000, wherein a vehicle 2002 comprising a first axle 2004 having a first wheel 2006 and a second wheel 2008 coupled thereto. The first axle 2004 being operably connected to a first rocker arm 2010 that is coupled to a first portion 2012 of the frame. A first spring 2014 mounted to a first portion 2012 of the vehicle frame and operably associated with the first rocker arm 2010. A first equalizer 2016 is operably associated with the first rocker arm 2010 and the first wheel 2006 and the second wheel 2008 coupled to the first axle 2004. Furthermore, the vehicle frame comprising a second axle (not shown) having a first wheel (not shown) and a second wheel coupled thereto (not shown). The second axle being operably connected to a second rocker arm (not shown) coupled to a second portion (not shown) of the frame. A second spring mounted to a second portion of the vehicle frame and operably associated with the second rocker arm. A second equalizer mounted to the second rocker arm and operably interconnected with the first wheel and the second wheel coupled to the second axle. Therefore, the first rocker arm 2010 and the second rocker arm (not shown) independently displace the first and second springs respectively to act as a suspension system in response to application of a force.

IV. Propulsion System

Disclosed herein are embodiments of an electrically powered system, such as a frame, trailer, vehicle, trailer, cart, and/or cycle, wherein propulsion can be delivered via an electrical system. The electrical system may include, for example, a control electrically coupled to a motorized wheel to deliver power to the motorized wheel and to assist propelling a frame, trailer, cart, and/or cycle.

In certain embodiments, the electrical system of the electrically powered trailer may include a display, a pedal assist sensor, a power source, a controller, and an electric motor. In alternative embodiments, the electric system may include a throttle, a display, a pedal assist sensor, a power source, a controller, and an electric motor. In certain embodiments, the electric system may include a pedal assist sensor, a throttle, a display, a pedal assist sensor, a controller, a power source, and an electric motor. The electric system may comprise cabling to connect features of the system and such cables may be suitable for transmitting power and/or data.

The power source may include a power supply and a controller. In some embodiments, the power supply is a battery or a rechargeable battery. The power supply may be suitable for powering the electrically powered trailer and may be configured to connect to an electric motor, for example an electric motor located on a wheel. The power supply may be configured for providing power at a range from greater than 0 volts to 100 volts, such as from 24 volts, 36 volts, 48 volts, or any other voltage.

In certain embodiments the electrically powered trailer may include a controller for implementing power to the electric motor. In certain embodiments, the controller can control the motor output power. In other aspects the controller may also regulate the speed of the electrically powered trailer. In some embodiments, the controller is a computing system comprising a central processing unit (CPU). Moreover, the controller can be configured to manage the power output by the power source. The controller may be operable connected to a power connector for connecting the power source to the electric motor, and to a control connector for connecting at least one control.

In some embodiments, the electric motor is separably connectable to the power source via a power connector. Moreover, a controller may transmit a signal communicating data to the power source, wherein the controller uses the data to manage the supply of power by the power source and the controller is separably connectable to the power source via a connector.

In particular disclosed embodiments, an electrically powered trailer is associated with an external vehicle. For example, the external vehicle can be a bicycle, wherein the pilot rider of the bicycle can control power delivered to the electrically powered trailer to assist with propulsion of the electrically powered trailer and bicycle.

In some embodiments, the components of the electrical system can be external components, wherein the controls are coupled to an external vehicle. Thus, the electrically powered trailer may receive input from a pilot user via the external components. For example, the electrically powered trailer can be associated with a bicycle, wherein the bicycle pilot transmits information to the electric system.

Figure 21:
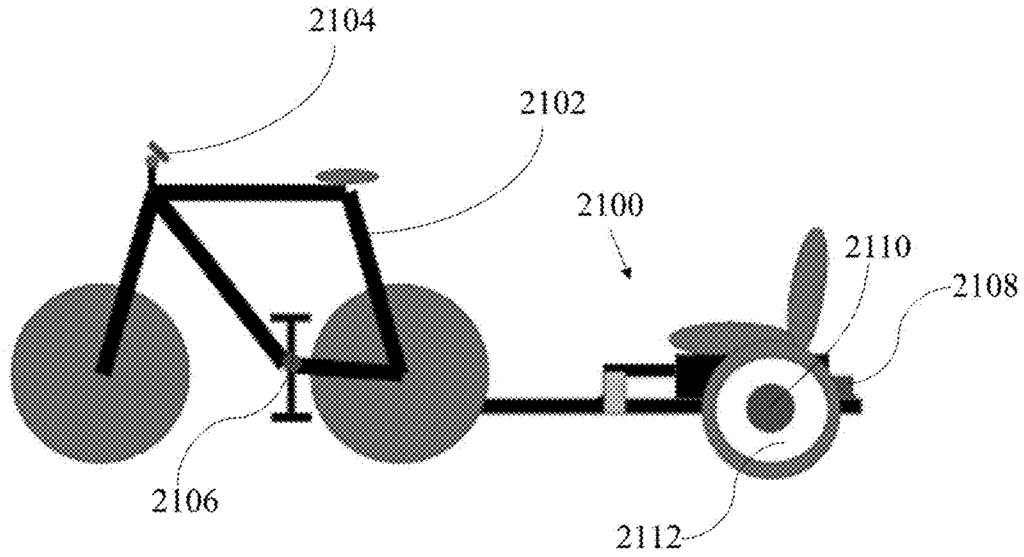
FIG. 21 is a schematic side view illustrating view of an electrically powered trailer operably connected to a bicycle.

FIG. 21 illustrates an embodiment of an electrically powered trailer 2100 operably associated with a bicycle 2102. Electrical system controls may be coupled to the bicycle 2102. Thus, FIG. 21 illustrates a display 2104 and a pedal assist sensor 2106 mounted to the bicycle 2102. Moreover, an electrically powered trailer 2100 may include a housing 2108 to house a power source and controller, which can be electrically coupled to an electric motor 2110 that is operatively associated with a wheel 2112.

In particular disclosed embodiments, the performance characteristics of an electrically powered trailer can be controlled by the external components. In certain embodiments, appropriate software controls and/or monitors the performance of the electrically powered trailer.

In certain embodiments, the control parameters may include a pedal assist sensor, wherein the motor assists the electrically powered trailer. In other embodiments, the control parameters may include a power on demand mode, wherein the pilot rider controls the motor power output via a throttle. In some embodiments, an external component such as a control can be configured to determine one or more control parameters based on pilot rider and/or passenger.

The controller may be configured to manage the electrical power output by the power supply, and/or the power output of an electric motor. The controller may be configured to manage the power supply. Controller may be configured to manage the power supplied to the power connector. The controller may comprise a processor and data storage. The data storage may store computer executable instructions, wherein the processor may be configured to, when executing the instructions, control the power supply.

The controller can be configured to receive data from a control, or from multiple controls via a control connector of the power unit. The controller may be configured to control the power source such that power is supplied to the electric motor, or power is stopped from being supplied to the electric motor. The controller may vary the power output from the power supply, the power unit and/or electric motor, depending on the data received from the control or controls via the control connector(s). Thus, the controller may be configured to vary the power output based on data received from a single, or multiple, control devices.

The electrical system may include a controller connector for connecting the controller to the power source or the controller connector of the power source. The controller connector may comprise a power and/or data cable and an associated male/female connector head. The power/data cable may be attached to, or integral with, members of an associated frame or electrically powered trailer or cart. The control connector of the power source may, for example, comprise a standard USB input/output port. The control connector, connected to the control, may comprise a data cable integral with a USB connector, arranged to be inserted into the control connector of the power source, thereby connecting the control to the power source. Alternatively, the controller connector and controls connectors may both comprise wireless transceivers.

In certain embodiments, a housing comprising a motor is configured to at least one wheel of the electrically powered trailer. The motor can be any motor for powering a bike. In some embodiments, the motor can be a hub motor for mounting on the hub of a wheel. In certain embodiments, the motor may include a rotor and a stator to generate a rotary force to drive at least one wheel. The housing is installed on the wheel so as to be rotated together with the wheel. The motor may be geared or gearless and the motor can have any suitable motor rating, such as a motor rating ranging from 100 watts to 1000 watts.

In some embodiments, the power source can power the electric motor. The motor may be powered by DC power. The motor may comprise solid-state electronic switching circuit. The motor may be configured to be powered by asynchronous AC power.

In some embodiments, the electrically powered trailer may include a compartment for securing the power source. The electrically powered trailer may include a connector to connect the power source to the electrical system. In certain embodiments, the electrically powered trailer includes a cover for protecting the connector.

The electric system may comprise a motor connector for connecting the motor to the power source or the power connector of the power source. A motor connector may facilitate connecting the power source to the motor. The motor connector may comprise a power cable and an associated male/female connector head. The motor connector may be conveniently located for connection with a power connector of the power source. The power cable may be attached to, or integral with members of the frame of the electrically powered trailer. A motor connector may be compatible with a power connector of the power source.

In certain embodiments the control may comprise an electronic device, wherein information may be used to determine how much power the electric motor should output. This may be achieved by controlling the amount of power output by the power source to the motor.

The electric system may comprise one or more controls, each with corresponding control connectors connectable to the power source. In some embodiments, the controls can be a throttle, a pedal-assist sensor, or a display. In particular disclosed embodiments, the controls can communicate with the controller wirelessly and/or through wired connection, for example, through the control connectors. These controls can be a computing system, at least one data source, and/or network. In some embodiments, the control can be a display. In certain embodiments, the display can include a dashboard that projects any of the measured, detected, or calculated parameters, conditions, directions, controls, inputs, and/or the like. The display device provides for the presentation of a graphical user interface (GUI) application software data, and multimedia presentations, and the like. The display may further include one or more multimedia devices, such as speakers, video cards, graphics accelerators, and microphones, and the like.

In some embodiments, the electrically powered trailer may comprise a load distribution system to engage with at least one suspension spring. The load distribution system may include a rocker arm and a spring that are associated with a frame having an axle or to which an axle can be mounted. In some embodiments, the load capacity of the system may be in the range of from greater than 0 pounds to 10,000 pounds, such as from greater than 0 pounds to 6,000 pounds, from greater than 0 pounds to 3,500 pounds, from greater than 0 pounds to 3,500 pounds, or from greater than 0 pounds to 2,000 pounds.

Figure 22:
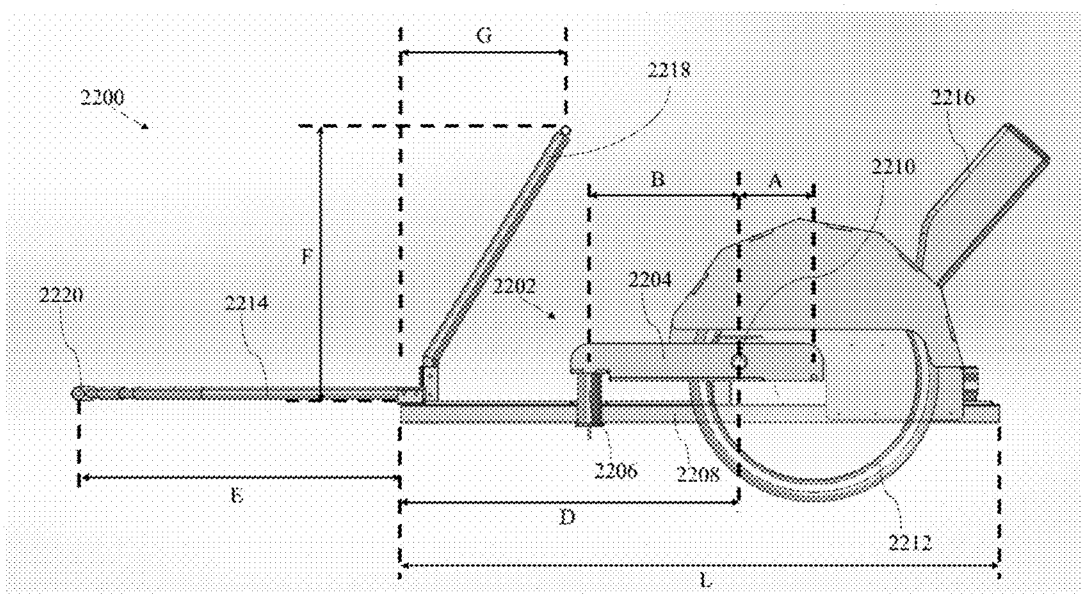
FIG. 22 is a side schematic view of an electrically powered trailer having a load distribution system comprising a rocker arm configured to displace a spring mounted to the frame of the electrically powered trailer, and further comprising a motorized wheel rotatably coupled to rocker arm.

FIG. 22 is a schematic side view illustrating an embodiment of an electrically powered trailer 2200 comprising a load distribution system 2202 comprising a rocker arm 2204 operably associated with a spring 2206 and frame 2208. Frame 2208 of the electrically powered trailer 2200 is associated with an axle at a pivot point 2210. Moreover, the rocker arm 2204 is rotatably attached to a wheel 2212 comprising an electric motor. A tongue 2214, attached to the frame 2208, can be coupled to a vehicle, such as a cycle (now shown). Additionally, the frame 2208 includes a seat 2216 for a passenger and a handle 2218.

In some embodiments, the rocker arm may comprise a first end portion and a second end portion. A spring can be coupled to the first end portion of the rocker arm and an axle can be coupled to the second end portion of the rocker arm. With reference to FIG. 22, the first end portion of the rocker arm can have a length B ranging from greater than 0 inches to 30 inches, such as from greater than 0 inches to 20 inches, from inches to 18 inches, from 6 inches to 15 inches, from 8 inches to 14 inches, or from 10 inches to 13 inches. Moreover, the second end portion may be operably coupled to the axle can have a length A ranging from greater than 0 inch to 20 inches, such as from 2 inches to 8 inches, from 3 inches to 8 inches, from 3 inches to 7 inches from 4 inches to 6 inches.

In certain embodiments, the electrically powered trailer can have a length L (see FIG. 22) in the range of from greater than 0 inch to 100 inches, such as from 20 inches to 60 inches, such as from 30 inches to 55 inches, from 30 inches to 50 inches, from 30 inches to 45 inches, or from 30 inches to 40 inches. Moreover, the center of the pivot point 210 can be operably connected to rocker arm 204 at length D from the end portion of the frame **2*s*08 coupled to the tongue 2214**. Length D can range from greater than 0 inches to 45 inches, such as from 15 inches to 40 inches, from 15 inches to 35 inches, or from 20 inches to 30 inches.

In some embodiments, the tongue 2214 extends out from the frame 2208. A first end portion of tongue 2214 is attached to the frame 2208 and a second end portion is coupled to a vehicle via a hitch 2220. As illustrated by FIG. 22, in certain embodiments the tongue can extend out to a length E from the frame that ranges from greater than 0 inch to 50 inches, such as from 15 inches to 35 inches, from 15 inches to inches, or from 20 inches to 30 inches.

In certain embodiments, handlebar 2218 attached to the frame 2208 can be used by a passenger for support. Furthermore, as illustrated by FIG. 22, the handlebar can have a length F of from greater 0 inch to 25 inches, such as from 5 inches to 25 inches, from 10 inches to 25 inches, from 15 inches to 25 inches, or from 15 inches to 20 inches. Furthermore, an end portion of frame 2208 can have a length G of from greater than 0 inch to 20 inches, such as from 5 inches to 20 inches, 10 inches to 20 inches, or from 15 inches to 20 inches.

In some embodiments, the frame is constructed from wood, metal, or alloy. For example, the frame can be made from steel, aluminum, or a combination thereof. In an exemplary embodiment, the frame was constructed from 6061 steel alloy. In another exemplary embodiment, a frame was constructed from wood.

In some embodiments of the electrically powered trailer comprising a load distribution system, at least one spring can have a free length (F.L.) in the range of greater than 0 inch to 25 inches, such as from 5 inches to 15 inches, or from 5 inches to 10. In some embodiments the spring can have an outside diameter (O.D.) of from greater than 0 inch to 10 inch, such as from 1 inch to 4 inches, from 1 inch to 3 inches, or from 1 inch to 2 inches. In some embodiments, the spring can have an inside diameter (I.D.) of from greater than 0 inch to 10 inch, such as from 1 inch to 4 inches, from 1 inch to 3 inches, or from 1 inch to 2 inches. In some embodiments, the spring can have a wire diameter (W.D.) of from greater than 0 inch to 2 inches, such as from greater than 0 inch to 1.5 inches, from greater than 0 inch to 1 inch, or from greater than 0 inch to 0.5 inch.

In some embodiments an electrically powered trailer can comprise a load distribution system comprising at least one spring, such as spring 2206. Such spring can have any suitable spring rate selected according to a desired capacity, such as a spring rate measured in pound/inch (k). In some embodiments, the spring rate can have a range of from 20 pounds/inch to 300 pounds/inch, such as from 40 pounds/inch to 200 pounds/inch, from 60 pounds/inch to 150 pounds/inch. In one exemplary embodiment, the spring has a spring rate of 137 pounds/inch. In yet another exemplary embodiment, the spring has a spring rate of 353 pounds/inch.

Figure 23:
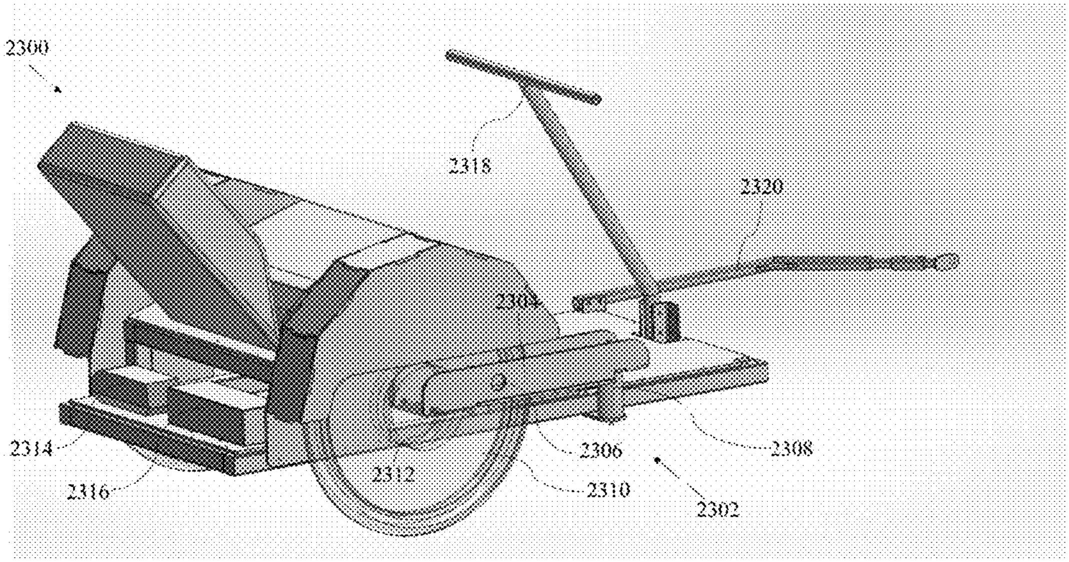
FIG. 23 is a perspective side view of an embodiment of the present disclosure comprising an electrically powered trailer having a load distribution system, wherein the load distribution system includes a rocker arm configured to a spring mounted onto the outside of the frame of the electrically powered trailer, and a motorized wheel rotatably coupled to rocker arm.

The rocker arm is operably associated with the axle and is configured to displace the spring to act as a suspension system in response to a force applied to the rocker arm. Certain embodiments are configured for retrofitting to an existing frame, such as a trailer or vehicle frame, comprising at least one axle. FIG. 23 is a schematic side perspective view of an embodiment of an electrically powered trailer 2300 configured with a load distribution system 2302. The load distribution system 2302 comprises a rocker arm 2304 operably associated to an axle at a pivot point 2306 and a spring 2308, wherein the rocker arm 2304 is configured to displace the spring 2308 to act as a suspension system in response to a force applied to the rocker arm 2304. Moreover, the rocker arm 2304 is rotatably coupled to wheel 2310 comprising a spindle 2312. Spindle 2312 is fitted into the aperture and secured with at least one fastener.

Figure 24:
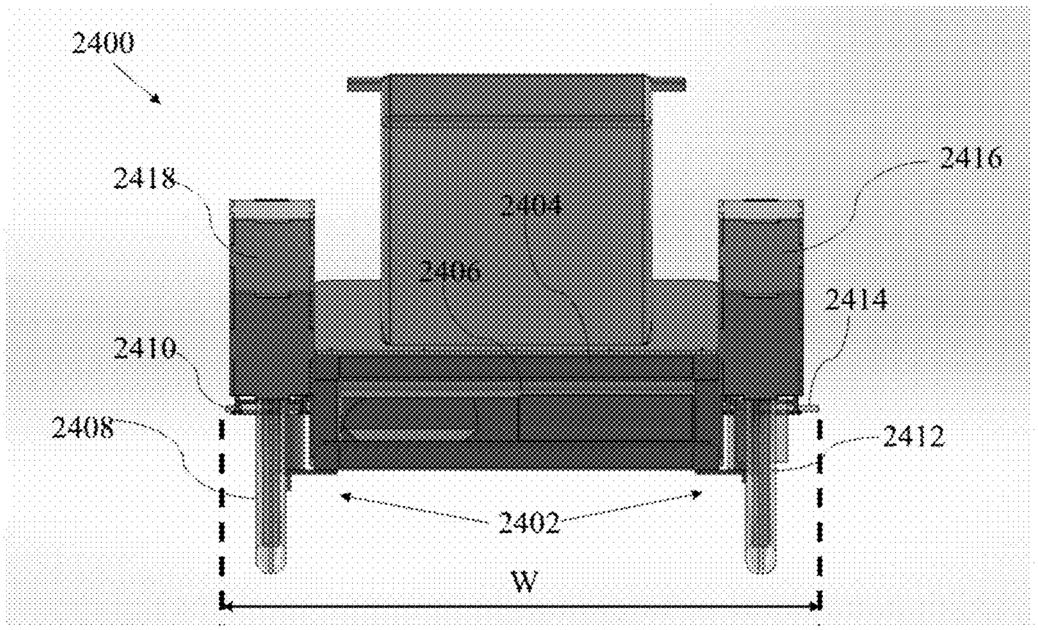
FIG. 24 is a rear view of an embodiment of the present disclosure comprising an electrically powered trailer having a load distribution system, wherein the load distribution system includes a rocker arm configured to displace a spring mounted to the frame of the electrically powered trailer, and further comprising a motorized wheel rotatably coupled to rocker arm.

FIG. 24 is a schematic rear view illustrating an embodiment of the electrically powered trailer 2400 comprising a load distribution system 2402. Trailer 2304 can have any suitable or desired dimensions, such as a width W ranging from greater than 0 feet to 5 feet, such as from 1 foot to 4 feet, 1 foot to 3 feet, or from 2 feet to 3 feet. Moreover, FIG. 24 depicts an electrically powered trailer frame 2404 comprising an axle 2406 linking a first rocker arm (not shown) attached to a first wheel 2408 via a first spindle 2410. Wheel 2408 is coupled to an electric motor (not shown). A second rocker arm (not shown) is attached to a second wheel 2412 via a second spindle 2414, thereby linking the first rocker arm to the second rocker arm. Additionally, FIG. 24 illustrates a first fender 2416, configured to the frame 2404 above the first rocker arm, and a second fender 18, configured to the frame 2404 above the second rocker arm.

In some embodiments, the axle can be made from a metal or alloy. For example, the axle can be made from steel, aluminum, or a combination thereof. The axle can have a diameter in the range of from greater than 0 inch to 5 inches.

In particular disclosed embodiments, the axle is placed through a receiver, which operates as a cover for the axle. In some embodiments, the receiver is a hollow pipe that is attached to the underside/bottom of the frame perpendicular to the wheels. In some embodiments, the receiver can be attached to the frame via welding. A sleeve bearing can be attached to the ends of the receiver, wherein the axle extends into the sleeve bearing and is thereby supported by the sleeve bearing. In some embodiments, the outer diameter (O.D.) of the sleeve bearing can be in the range from greater than 0 inch to 5 inches, such as from 1 inch to 4 inches, 1 inch to 3 inches, or 1 inch to 2 inches In other aspects, the inner diameter inner diameter (I.D.) of the sleeve bearing can have a range from greater than 0 inch to 5 inches, such as from 1 inch to 4 inches, 1 inch to 3 inches, or 1 inch to 2 inches. In other particular disclosed embodiments, the length (L) of the sleeve bearing can be in the range of from greater than 0 inch to 5 inches, greater than 0 inch to 4 inches, greater than 0 inch to 3 inches, greater than 0 inch to 2 inches, greater than 0 inch to 1 inch, greater than 0 inch to 0.5 inch. In some embodiments, the flange thickness (F.T.) of the sleeve bearing can be in the range of from greater than 0 inch to 1 inch, such as from greater than 0 inch to 0.8 inch, from greater than 0 inch to 0.6 inch, from greater than 0 inch to 0.4 inch, from greater than 0 inch to 0.3 inch, from greater than 0 inch to 0.2 inch, or from greater than 0 inch to 0.1 inch.

In particular disclosed embodiments, the material of the sleeve bearing is a metal or metal alloy. For example, the metal can be iron-copper, or bronze. In an exemplary embodiment, the metal is 863 iron copper. In some embodiments, the sleeve bearing is an oil embedded sleeve bearing and thus self-lubricates. The oil can be a lubricant such as a natural oil (e.g., mineral or vegetable oils) or synthetic oils, or blends thereof. For example, the lubricant can be SAE 90 oil, ISO 460 oil, or SAE 20 oil. As a result, the oil-embedded sleeve bearings allow for the rocker arms to pivot independently, which allows for the axle to move as the rocker arms move.

In some embodiments, the sleeve bearing may have a sleeve bearing radial capacity in the range of 200 pounds to 5,000, such as from 300 pounds to 4,000 pounds, from 400 pounds to 2,000 pounds, from 500 pounds to 1,800 pounds, from 600 pounds to 1,600 pounds, from 800 pounds to 1,400 pounds, or from 900 pounds to 1,200.

Figure 25:
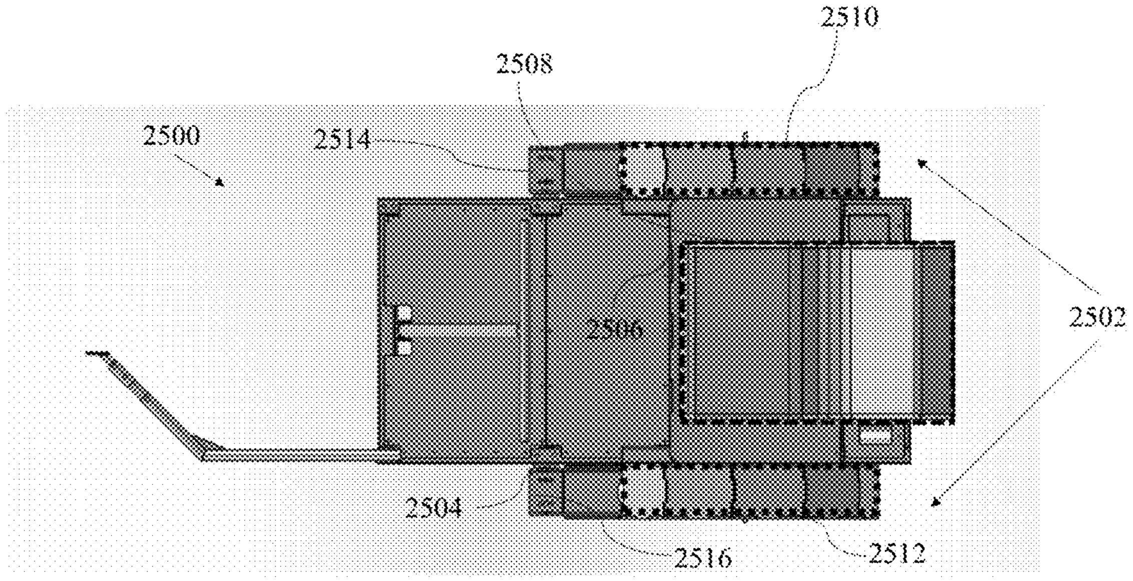
FIG. 25 is a plan view of an electrically powered trailer comprising a load distribution system, wherein the load distribution system includes a rocker arm configured to a displace a spring mounted to the frame of an electrically powered trailer, and further comprising a motorized wheel rotatably coupled to rocker arm.

FIG. 25 is a schematic top view of one disclosed embodiment of an electrically powered trailer 2500 comprising a load distribution system 2502. Frame 2504 of the electrically powered trailer 2500 comprises a platform 2506 comprising a seat 2508. Instead of, or in addition to seat 2508, trailer 2500 can include a security system to secure a wheelchair to the frame 2504. A first fender 2510 and a second fender 2512 are attached to frame 2504. Fenders 2510 and 2512 may form an arc shape that extends over a first tire and second tire, respectively. In some embodiments, the fender can be constructed from wood a metal or alloy, such as steel, aluminum, or a combination thereof. Moreover, the frame 2504 may comprise a first mount for mounting a first spring and a second mount for mounting a second spring. A first end portion 2514 of a first rocker arm is operably coupled to the first spring, and a first end portion 2516 of a second rocker arm is coupled to the second spring.

Figure 26:
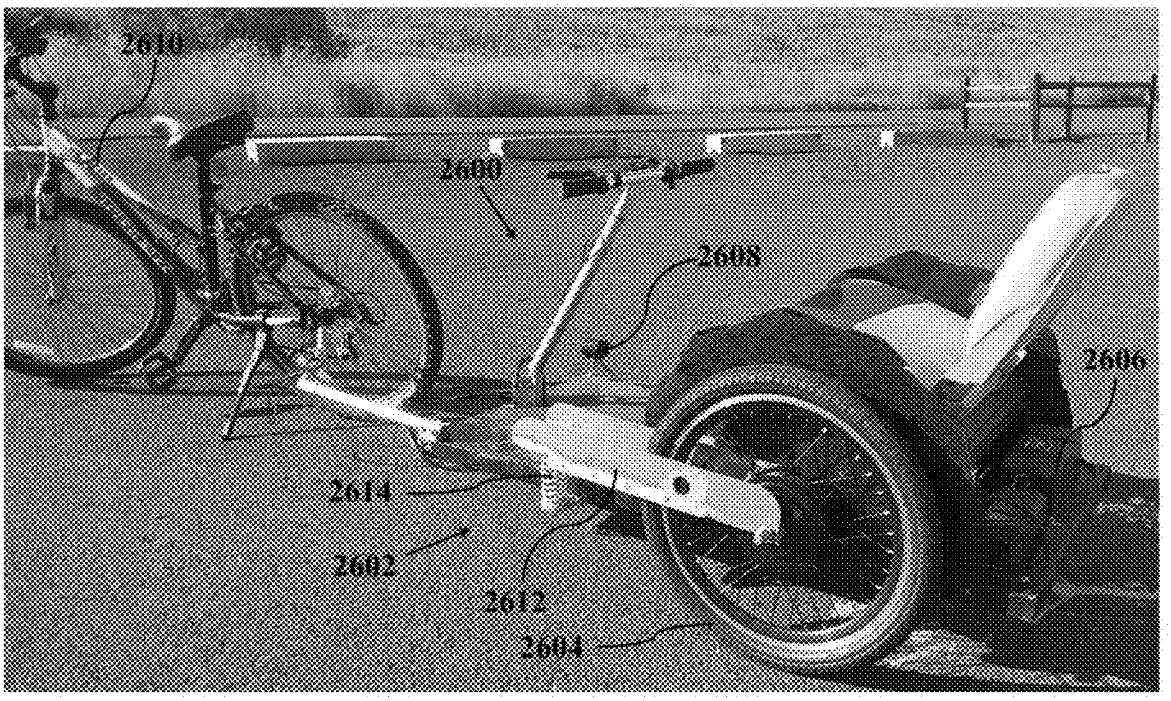
FIG. 26 is an image of an electrically powered trailer comprising a load distribution system, wherein the load distribution system includes a rocker arm configured to displace a spring mounted to the frame of the electrically powered trailer, and further comprising a motorized wheel rotatably coupled to rocker arm.

Traditional bicycle trailers do not include suspension systems, which results in a rough ride for a passenger. FIG. 26 is an image of an exemplary embodiment of an electrically powered trailer comprising a first-class lever load distribution system that facilitates a smooth, shock-free ride while minimizing any leaning of the trailer during cornering. Thus, the ride for the passenger on the trailer is optimized for long range traveling.

The electrically powered trailer 2600 comprises a load distribution system 2602 coupled to a motorized wheel 2604. The electrically powered trailer 2600 also comprises a housing for a battery 2606 and controller. In some embodiments, the electrically powered trailer may include additional features, such as a headlight 2608, seatbelt, cupholders, footrests, supportive seats, reflectors, and the like. Meanwhile, the controls for the electric system are mounted to the pilot bicycle 2610 and include a pedal-assist sensor, throttle, and display. In this manner, the pilot rider controls the power delivered by the trailer to assist with propulsion. The load distribution system 2602 includes a rocker arm 2612 operably associated with an axle and configured to displace a spring 2614 mounted to the frame of the electrically powered trailer in response to a force applied to the rocker arm 2612.

V. Method of Assembling

A method of assembling the load distribution is also disclosed herein. Certain embodiments are configured for retrofitting to an existing frame, such as a trailer or vehicle frame, comprising at least one axle. In particular disclosed embodiments the trailer or vehicle frame may include one axle. In other embodiments, the trailer or vehicle frame may include two axles.

In some embodiments, the method may include configuring a spring to be disposed on an outer surface of a frame comprising at least one axle; mounting a rocker arm to be operably associated with the axle and the spring and configured to displace the spring to act as a suspension system in response to a force applied to the rocker arm. In some embodiments, the method further includes coupling at least one wheel to the rocker arm.

In alternative embodiments, the method may include configuring a spring to be disposed on an outer surface of a frame comprising at least one axle; mounting a rocker arm to be operably associated with the axle and the spring, and configured to displace the spring to act as a suspension system in response to a force applied to the rocker arm; attaching an equalizer to the rocker arm; and coupling at least one wheel to the equalizer.

Figure 27:
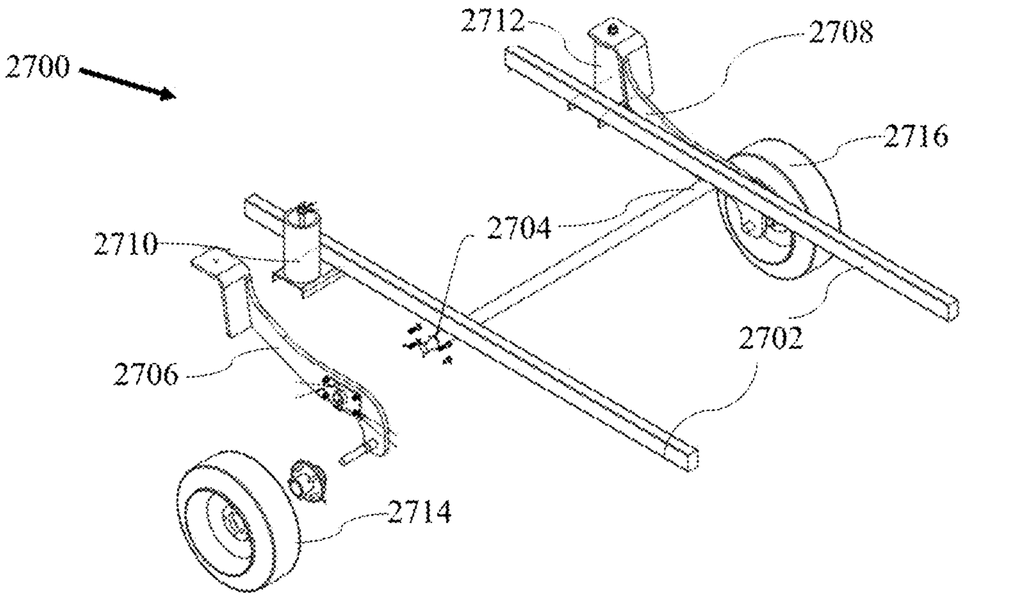
FIG. 27 is an exploded perspective view of an embodiment of the load distribution system comprising a single axle configuration.

A method of assembling the load distribution system 2700 to a vehicle frame 2702 having an axle 2704 is illustrated by FIG. 27. A first end portion of the axle 2704 is operably connected to a first rocker arm 2706 that is coupled to a first portion of the frame 2702. A second end portion of the axle 2704 is coupled to a second end portion of a second rocker arm 2708 that also is operably associated with frame 2702. A first end portion of the first rocker arm 2706 is operably associated with a first spring 2710 mounted to a first portion of the vehicle frame 2702. A first end portion of the second rocker arm 2708 is operably associated with a second spring 2712 mounted to a second portion of the vehicle frame 2702. In some embodiments, the method may further comprise attaching a first wheel 2714 to the first rocker arm 2706 and a second wheel 2716 to the second rocker arm 2708.

Figure 28:
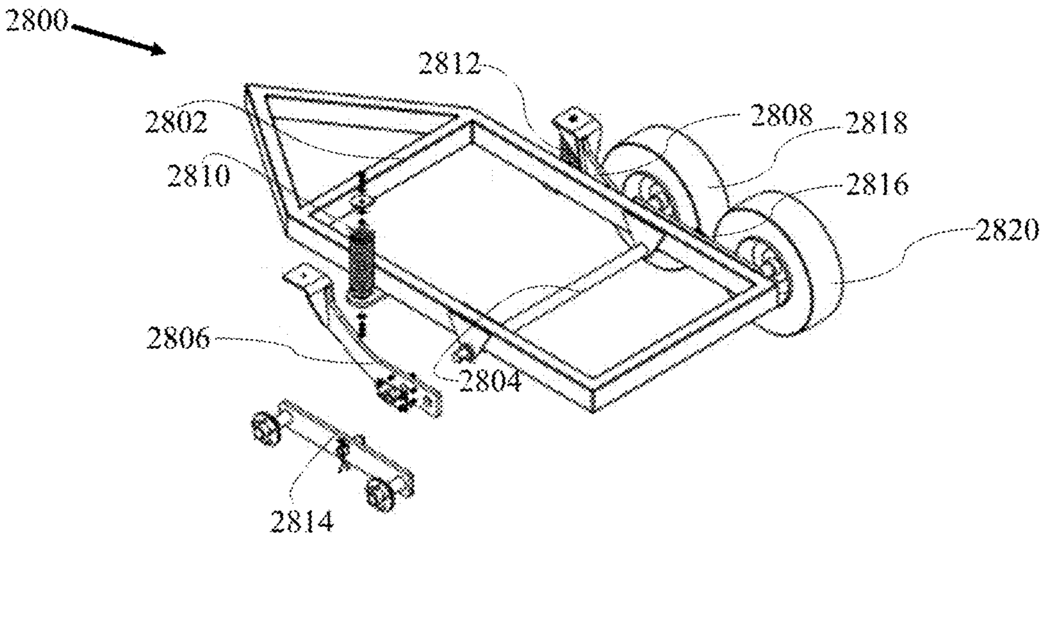
FIG. 28 is an exploded perspective view of an embodiment of the load distribution system comprising a tandem axle configuration.
Figure 29:
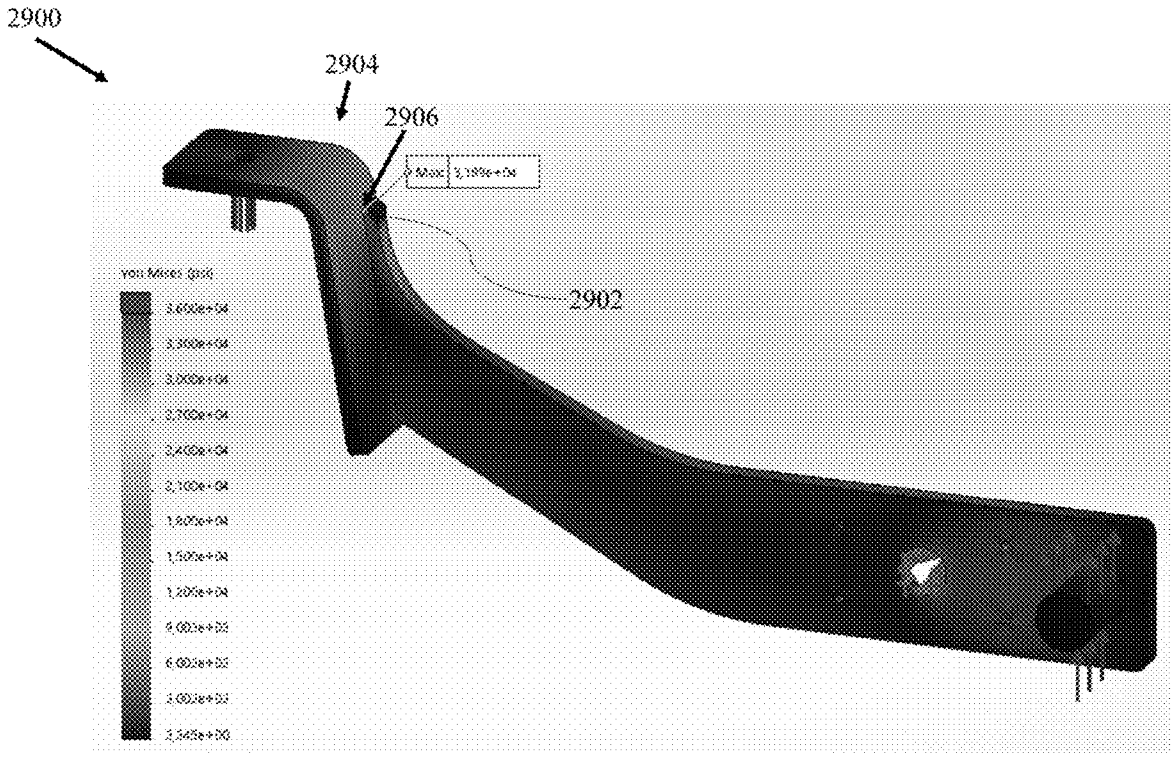
FIG. 29 is a perspective schematic view of a rocker arm used in one aspect of a disclosed load distribution system.

A method of assembling the load distribution system 2800 to a vehicle frame 2802 having an axle 2804 is illustrated by FIG. 28. A first end portion of the axle 2804 is operably connected to a first rocker arm 2806 that is coupled to a first portion of the frame 2802. A second end portion of the axle 2804 is coupled to a second end portion of a second rocker arm 2808 that also is operably associated with frame 2802. A first end portion of the first rocker arm 2806 is operably associated with a first spring 2810 mounted to a first portion of the vehicle frame 2802. A first end portion of the second rocker arm 2808 is operably associated with a second spring 2812 mounted to a second portion of the vehicle frame 2802. In some embodiments, the method may further comprise attaching a first equalizer 2814 to the first rocker arm 2806; and attaching a second equalizer 2816 to the second rocker arm 2808. In some embodiments, the method may further comprise attaching a first wheel (not shown) and second wheel (not shown) to the first equalizer 2814; and a third wheel 2818 and a fourth wheel 2820 to the second equalizer 2816.

VI. Examples

Example 1

This example models forces experienced by a rocker arm of a disclosed load distribution system. Rocker arm 2900 comprises a finger portion 2902 attached to a first end portion 2904. The first end portion 2904 is operably associated with a spring when assembled and is configured to displace the spring to act as a suspension system in response to a force applied to the rocker arm. Finger portion 2902 of rocker arm redistributes the stress concentration when a force is applied.

Without the finger portion 2902, a stress concentration is applied to the rocker arm. Finger 2902 redistribute stress around the finger area with a stress of $3.189e^{04}$.

Therefore, this example illustrates using a finger portion to distribute stress across the finger portion of the rocker. A rocker arm that does not include a finger portion produces a high stress concentration in the upper end portion of the rocker arm.

Example 2

Figure 30:
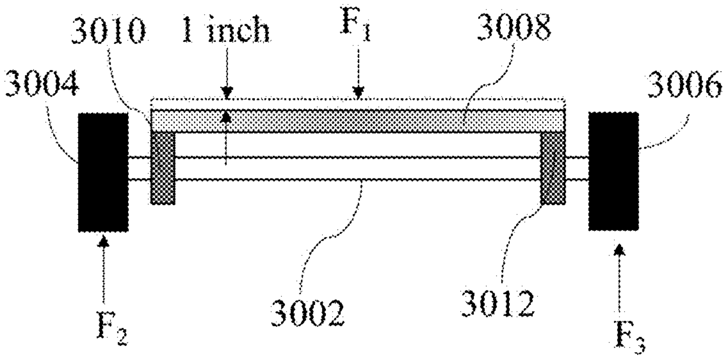
FIG. 30 is a schematic end view modeling the stability performance of an even load distribution applied to a traditional suspension system comprising a leaf spring.

In this example, a traditional suspension system was modeled. FIG. 30 represents the calculated modeling where a 2000-pound load $F_1$ was placed in the center of the trailer having an axle 3002 length of 52 inches. Aa 1000-pound force $F_2$ and a 1000-pound force $F_3$ in the upward longitudinal direction was placed on a first tire 3004 and second tire 3006. The evenly distributed load resulted in a balanced 1-inch depression of the trailer frame 3008 via a first spring 3010 and second spring 3012. Thus, an evenly distributed load through the center of gravity of the trailer results in a balanced depression of the trailer springs and the frame.

Figure 31:
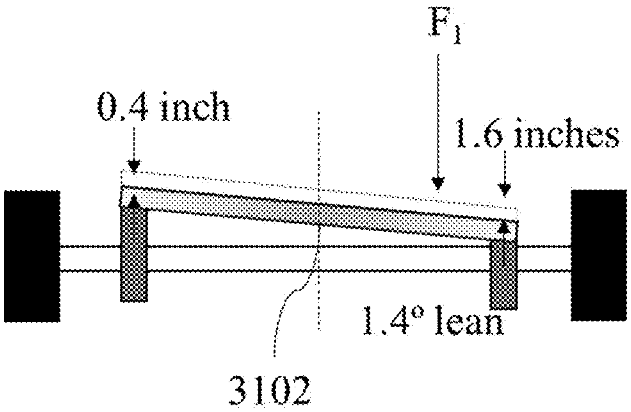
FIG. 31 is a schematic end view modeling the stability performance of an uneven load distribution applied to a suspension system comprising a leaf spring.

FIG. 31 represents calculated modeling where an unevenly distributed 2000-pound load $F_1$ was placed 15 inches away from the center of the trailer frame 3102. The sides in traditional suspension systems are independent of each other. When a load is offset to one side of the trailer frame or during cornering, a 0.4-inch compression results on one end and a 1.6 inches compression results on the opposite end. Thus, the unevenly distributed load resulted in a 1.4° lean.

Example 3

Figure 32:
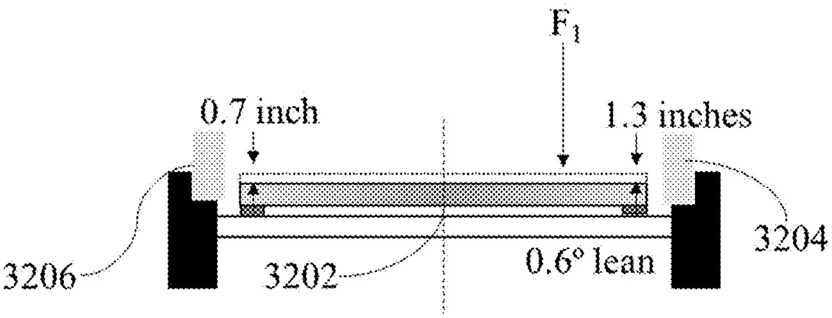
FIG. 32 is a schematic end view modeling the stability performance of an uneven load distribution applied to an embodiment of a disclosed load distribution system.

In this example, an embodiment of the load distribution system disclosed herein was modeled and compared to the model of Example 2. FIG. 32 illustrates an unevenly distributed 2000-pound load $F_1$, which was placed 15 inches away from the center of the trailer frame 3202. The unevenly distributed load resulted in a balanced depression of 0.7 inch of the left end portion of the trailer frame 3202 and a 1.3 balanced depression on the right portion of the trailer frame with a 0.6° lean. Moreover, the first rocker arm and second rocker arm displace springs respectively to act as a suspension system in response to the application of force.

Therefore, the linking of both sides of the trailer frame via the axle and first rocker arm and the second rocker arm reduces trailer leans during cornering or when caring a non-centered load. Additionally, the first rocker arm and second rocker arm used to compress the first spring 3204 and second spring 3206 spring redirect the shock loading back downward into the frame 3202 instead of upwards and into the cargo when navigating uneven terrain.

Example 4

In this example, the shock loading of a traditional trailer was compared to a trailer comprising an embodiment of the load distribution system comprising a single axle configuration. Both trailers had the same capacity, similar weights, and carried the same load, and were pulled over a two by four piece of plywood at approximately 22 mph.

Figure 33:
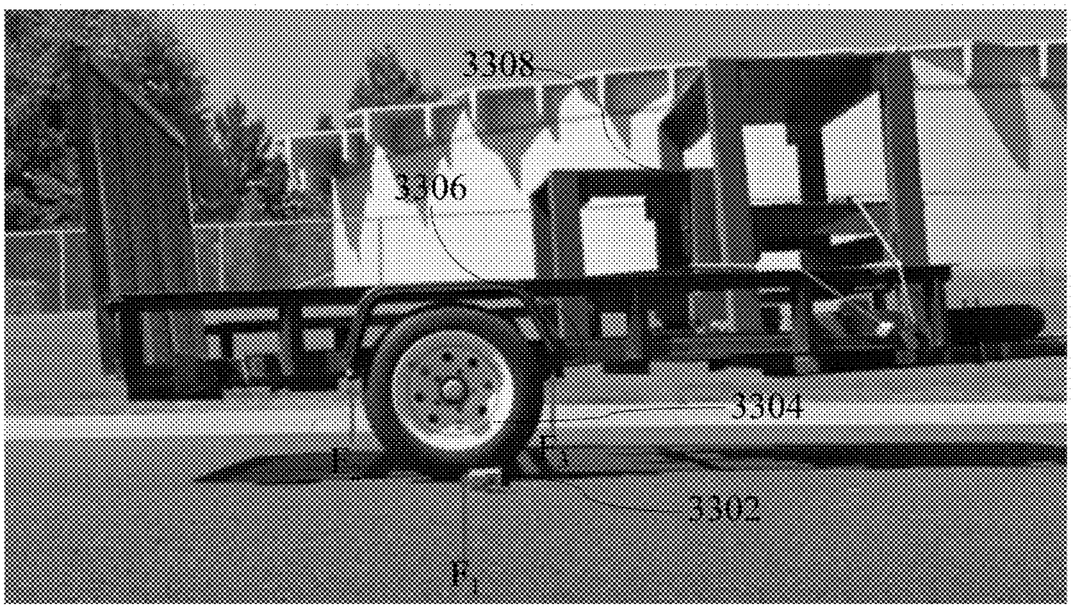
FIG. 33 is a side image illustrating the results of a stability performance of a force applied by an obstacle to a suspension system comprising a leaf spring.

FIG. 33 illustrates the shock forces $F_1$, $F_2$, $F_3$ caused by the obstacle 3302 on the traditional trailer. An approximately 3 inches bounce in the upward direction was observed in addition to the tire 3304 departing the ground two separate times. Forces are transmitted up through the tire, the suspension system, the frame 3306, and ultimately the cargo 3308, which caused the trailer to bounce 3 inches in the upward direction.

Figure 34:
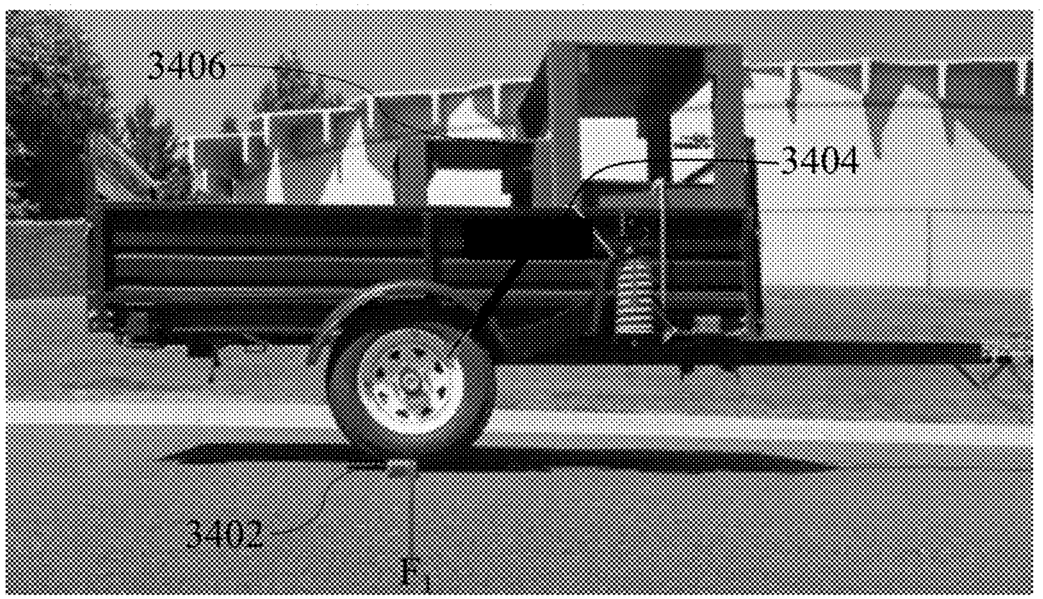
FIG. 34 is a side image illustrating the results of a stability performance of a force applied by an obstacle to a disclosed embodiment of a load distribution system.

In contrast, FIG. 34 illustrates the shock force $F_1$ caused by the obstacle 3402 on a trailer comprising an embodiment of the load distribution system comprising a single axle configuration. The trailer jump is only about 1.5 inches and the wheels 3404 only departed the ground once. Thus, the shock loading $F_2$ was redirected much more effectively in a downward direction and away from the cargo 3406.

This example demonstrates that disclosed embodiments of the load distribution system can be extremely useful for trailers that carry valuable cargo, such as animals. For example, racehorses usually have to travel long distances on trailers, which encounter similar obstacles, and thus the load distribution system disclosed herein can provide a competitive advantage by reducing the amount of stress on the legs of the racehorses prior to a race.

In view of the many possible embodiments to which the principles of the present disclosure may be applied, it should be recognized that the illustrated embodiments are only preferred examples of the present disclosure and should not be taken as limiting the scope of the present disclosure. Rather, the scope of the present disclosure is defined by the following claims. We therefore claim as our present disclosure all that comes within the scope and spirit of these claims.

We claim:

1. A trailer, comprising:

an axle extending across the trailer and operably coupled to a first rocker arm and a second rocker arm, wherein the first rocker arm and the second rocker arm pivot about the axle;

a first spring mounted to the trailer above the axle and operably associated with the first rocker arm;

a second spring mounted to the trailer above the axle and operably associated with the second rocker arm;

a power source operably associated with the trailer;

a computerized electrical system electrically coupled to the power source;

a first equalizer attached to the first rocker arm, a first wheel and a second wheel rotatably coupled to the first equalizer; and a second equalizer attached to the second rocker arm, a third wheel and a fourth wheel rotatably coupled to the second equalizer;

wherein at least one of the first wheel, the second wheel, the third wheel, or the fourth wheel is a motorized wheel.

2. A method, comprising coupling the trailer of claim 1 to a pedal actuated vehicle.

3. The trailer of claim 1, wherein the power source comprises at least one battery.

4. The trailer of claim 1, further comprising at least one control electrically coupled to the power source and to the motorized wheel.

5. The trailer of claim 1, wherein the motorized wheel is operably coupled to an electric motor having a rotor and a stator to generate a rotary force to drive the motorized wheel.

6. The trailer of claim 1, wherein the first spring is operably associated with a first end portion of the first rocker arm, and the second spring is operably associated with a first end portion of the second rocker arm.

7. The trailer of claim 6, wherein the first rocker arm and the second rocker arm each comprise a second end portion, and the second end portions each define an aperture configured to receive the axle therethrough.

8. The trailer of claim 7, wherein:

the first end portion of the first rocker arm comprises a length ranging from greater than 0 inches to 55 inches;

the second end portion of the first rocker arm comprises a length ranging from greater than 0 inches to 12 inches;

the first end portion of the second rocker arm comprises a length ranging from greater than 0 inches to 55 inches; and the second end portion of the second rocker arm comprises a length ranging from greater than 0 inches to 12 inches.

9. The trailer of claim 7, wherein a ratio of a length of the first end portion to a length of the second end portion of the first rocker arm is from 2 to 5; and a ratio of a length of the first end portion to a length of the second end portion of the second rocker arm is from 2 to 5.

10. The trailer of claim 4, wherein the at least one control is a throttle, a pedal-assist sensor, a display, or any combination thereof.

11. The trailer of claim 4, wherein the at least one control is coupled to a pedal actuated vehicle.

12. A method for assembling the trailer of claim 1, the method comprising:

mounting the first rocker arm and the second rocker arm to the axle extending across the trailer such that the first rocker arm and the second rocker arm pivot about the axle;

mounting the first spring to the trailer above the axle and operably associating the first spring with the first rocker arm;

mounting the second spring to the trailer above the axle and operably associating the second spring with the second rocker arm;

mounting the power source to the trailer such that the power source is operably associated with the trailer;

electrically coupling the computerized electrical system to the power source;

attaching the first equalizer to the first rocker arm, and the second equalizer to the second rocker arm;

rotatably coupling the first wheel and the second wheel to the first equalizer, and the third wheel and the fourth wheel to the second equalizer; and operably coupling an electric motor to at least one of the first wheel, the second wheel, the third wheel, or the fourth wheel to provide the motorized wheel.

13. A system, comprising a pedal actuated vehicle operably associated with the trailer of claim 1.

14. The system of claim 13, wherein the pedal actuated vehicle is a cycle.

15. The system of claim 14, wherein the cycle is a bicycle or a tricycle.

* * * * *